United States Patent
Amemiya

(10) Patent No.: US 7,216,799 B2
(45) Date of Patent: May 15, 2007

(54) TERMINAL PROVIDING SYSTEM

(75) Inventor: Kanae Amemiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 10/480,370

(22) PCT Filed: Jun. 11, 2002

(86) PCT No.: PCT/JP02/05780

§ 371 (c)(1),
(2), (4) Date: Jun. 7, 2004

(87) PCT Pub. No.: WO02/101619

PCT Pub. Date: Dec. 19, 2002

(65) Prior Publication Data

US 2005/0021730 A1 Jan. 27, 2005

(30) Foreign Application Priority Data

Jun. 11, 2001 (JP) .............................. 2001-176034

(51) Int. Cl.
*G06Q 40/00* (2006.01)
*G07D 11/00* (2006.01)
*G07F 19/00* (2006.01)
*G06F 19/00* (2006.01)
*G06W 30/00* (2006.01)

(52) U.S. Cl. .......................... 235/379; 235/385; 705/5
(58) Field of Classification Search ................ 235/379, 235/381, 385; 705/5, 6, 10, 28
See application file for complete search history.

(56) References Cited

U.S. PATENT DOCUMENTS

| | | | | | |
|---|---|---|---|---|---|
| 4,063,044 | A | * | 12/1977 | Stephan | 379/119 |
| 4,951,308 | A | * | 8/1990 | Bishop et al. | 379/91.01 |
| 5,095,195 | A | * | 3/1992 | Harman et al. | 235/381 |
| 5,631,947 | A | * | 5/1997 | Wittstein et al. | 379/114.17 |
| 6,006,148 | A | * | 12/1999 | Strong | 701/33 |
| 6,222,482 | B1 | * | 4/2001 | Gueziec | 342/357.08 |

(Continued)

FOREIGN PATENT DOCUMENTS

JP  6-187570  7/1994

(Continued)

OTHER PUBLICATIONS

Avis Introduced New Alpine POrtable Navigation System. www.avis.com/AvisWeb?JSP/global/en/aboutavis/press_room/2001-016.jsp (Apr. 26, 2001).*

(Continued)

*Primary Examiner*—Daniel Walsh
(74) *Attorney, Agent, or Firm*—Oblon, Spivak, McClelland, Maier & Neustadt, P.C.

(57) ABSTRACT

A plurality of terminals (40) that are provided to users, and a providing device (20) are placed at a providing place (2). The providing device includes a memory that stores information concerning the plurality of terminals (40). The providing device (20) specifies a terminal (40) that includes the application software that the user designates from the plurality of terminals (40) by applying information in the memory, and provides the terminal (40) to the user. A collecting device (30) is placed at a collecting place (3) for collecting terminals that are returned by the users, and collects terminals (40) returned by the users.

28 Claims, 16 Drawing Sheets

U.S. PATENT DOCUMENTS

| | | | |
|---|---|---|---|
| 6,594,548 B2 * | 7/2003 | Bagnordi | 700/233 |
| 6,941,270 B1 * | 9/2005 | Hannula | 705/1 |
| 2001/0056361 A1 * | 12/2001 | Sendouda | 705/5 |
| 2002/0050526 A1 * | 5/2002 | Swartz et al. | 235/472.02 |
| 2002/0147601 A1 * | 10/2002 | Fagan | 705/1 |
| 2002/0184087 A1 * | 12/2002 | Kasai | 705/14 |
| 2002/0194143 A1 * | 12/2002 | Banerjee et al. | 705/400 |
| 2003/0149600 A1 * | 8/2003 | Williams | 705/5 |
| 2004/0006517 A1 * | 1/2004 | Takatori | 705/26 |
| 2004/0016620 A1 * | 1/2004 | Davis | 194/205 |
| 2004/0111282 A1 * | 6/2004 | Haji-Ioannou | 705/1 |
| 2004/0193440 A1 * | 9/2004 | Mawatari | 705/1 |
| 2005/0040230 A1 * | 2/2005 | Swartz et al. | 235/383 |
| 2005/0060210 A1 * | 3/2005 | Levi et al. | 705/5 |
| 2005/0144049 A1 * | 6/2005 | Kuzunuki et al. | 705/6 |
| 2005/0216296 A1 * | 9/2005 | Kokubu | 705/1 |
| 2005/0239448 A1 * | 10/2005 | Bayne | 455/414.3 |

FOREIGN PATENT DOCUMENTS

| | | |
|---|---|---|
| JP | 6-325053 | 11/1994 |
| JP | 7-240810 | 9/1995 |
| JP | 2000-306015 | 11/2000 |
| JP | 2001-34580 | 2/2001 |
| KR | 1997-0064017 | 9/1997 |
| KR | 10-2001-0025775 | 4/2001 |

OTHER PUBLICATIONS

Eric Ng, Oct. 12, 1999, US firm offers start-ups system rentals, South China Morning Post, Hong Kong, p. 2.*

Clayton Boyce, Oct. 11, 1999, Technology Lessons, Journal of Commerce, New York, p. 7.*

Lisa David Allison, Dec. 1, 1998, Rent, Lease or Buy? That's a Good Question, Richmond Times, Richmond, VA, p. 8.*

PROQUEST Search "What should you ask when renting or leasing computers?" Oct. 1995.*

U.S. Appl. No. 10/480,370, filed Jun. 7, 2004, Amemiya.

U.S. Appl. No. 10/941,828, filed Sep. 16, 2004, Amemiya.

* cited by examiner

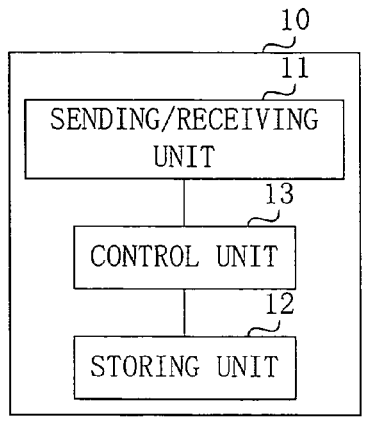

FIG. 2A

| MANAGEMENT TABLE | | |
|---|---|---|
| TERMINAL INFORMATION | LENDING SITUATION | USER INFORMATION |
| INFORMATION OF TERMINAL A | LENDING | INFORMATION OF USER D |
| INFORMATION OF TERMINAL B | NOT LENT | ---------- |
| INFORMATION OF TERMINAL C | RETURNED | ---------- |
| ⋮ | ⋮ | ⋮ |

FIG. 2B

| USER INFORMATION TABLE | | | |
|---|---|---|---|
| USER INFO | TERMINAL INFO OF TERMINAL THAT USER BORROWED | LENDING TIME AND DATE | RETURNING TIME AND DATE |
| INFO OF USER D | TERMINAL INFO OF TERMINAL A | 5/23,12:13 | 5/23,17:00 |
| INFO OF USER B | TERMINAL INFO OF TERMINAL F | 5/11,10:41 | 5/11,19:30 |
| | TERMINAL INFO OF TERMINAL C | 5/18,14:30 | 5/18,18:30 |
| INFO OF USER C | TERMINAL INFO OF TERMINAL G | 5/10,17:14 | 5/10,20:00 |
| ⋮ | ⋮ | ⋮ | ⋮ |

FIG. 2C

| LENDING TABLE |
|---|
| TERMINAL INFO OF TERMINAL AT TERMINAL PROVIDING PLACE |
| TERMINAL INFO OF TERMINAL B |
| TERMINAL INFO OF TERMINAL H |
| TERMINAL INFO OF TERMINAL K |
| ⋮ |

| MANAGEMENT TABLE | | | |
| --- | --- | --- | --- |
| TERMINAL INFO | LENDING SITUATION | RESERVATION SITUATION | UER INFO |
| INFO OF TERMINAL A | LENDING | NOT RESERVED | INFO OF USER D |
| INFO OF TERMINAL B | NOT LENT | RESERVED | ---------- |
| INFO OF TERMINAL C | RETURNED | NOT RESERVED | ---------- |
| ⋮ | ⋮ | ⋮ | ⋮ |

FIG. 8A

| RESERVING PERSON TABLE | | |
| --- | --- | --- |
| RESERVING PERSON INFO | TERMIANL ID | RESERVATION CODE |
| INFO OF USER K | AB0016 | ABC3210 |
| INFO OF USER L | AB0004 | BCD5678 |
| ⋮ | ⋮ | ⋮ |

FIG. 8B

| LENDING TABLE | |
| --- | --- |
| TERMINAL INFO OF TERMINALS AT TERMINAL PROVIDING PLACE | RESERVATION SITUATION |
| TERMINAL INFO OF TERMINAL B | RESERVED |
| TERMINAL INFO OF TERMINAL H | NOT RESERVED |
| TERMINAL INFO OF TERMINAL K | NOT RESERVED |
| ⋮ | ⋮ |

MANAGEMENT TABLE

| TERMINAL INFO | LENDING SITUATION | RESERVATION SITUATION | PLACING LOCATION | POSSIBLE LENDING TIME AND DATE | USER INFO |
|---|---|---|---|---|---|
| INFO OF TERMINAL A | LENDING | NOT RESERVED | A STATION | 5/11, 12:05 | INFO OF USER D |
| INFO OF TERMINAL B | NOT LENT | RESERVED | A STATION | 5/10, 14:00 | ------ |
| INFO OF TERMINAL C | RETURNED | NOT RESERVED | B STATION | 5/11, 7:00 | ------ |
| ... | ... | ... | ... | ... | ... |

FIG. 12B

TIME TABLE

| | TRAIN A | TRAIN B | TRAIN C | ... |
|---|---|---|---|---|
| A STATION | 4:00 | ------ | ------ | ... |
| B STATION | 4:17 4:20 | 4:30 4:47 4:50 | 5:00 5:17 5:20 | ... |
| C STATION | 4:33 4:35 | 5:03 5:05 | 5:33 5:35 | ... |
| ... | ... | ... | ... | ... |

| INVENTORY TABLE | |
|---|---|
| TERMINAL INFO | RESERVATION SITUATION |
| TERMINAL INFO OF TERMINAL B | RESERVED |
| TERMINAL INFO OF TERMINAL H | NOT RESERVED |
| TERMINAL INFO OF TERMINAL K | NOT RESERVED |
| ⋮ | ⋮ |

TERMINAL PROVIDING SYSTEM

TECHNICAL FIELD

The present invention relates to a terminal providing system, a terminal providing device, a terminal management device, a terminal providing method, a recording medium, and a program.

BACKGROUND ART

In business, etc., there are cases where portable terminals (note book computers, etc.) are applied to create documents, when transferring to a destination, to present the documents at the destination to clients.

In this case, even in a case where the portable terminal is used during transferring to the destination, or at the destination, a user has to carry the portable terminal from his/her house or company. In other words, the user has to carry the portable terminal even when the portable terminal is not necessary.

Therefore, the object of the present invention is to provide a terminal providing system, a terminal providing device, a terminal management device, a terminal providing method, a recording medium, and a program for providing a user terminal to a user, only when it is necessary for the user.

DISCLOSURE OF INVENTION

To achieve the above object, a terminal providing system according to a first aspect of the present invention, is characterized by comprising:

a plurality of terminals which are placed at a providing place for providing terminals to users, and comprise one or more application software;

a providing device which is placed at the providing place, and carries out processing for providing to a user, a terminal which comprises the application software that the user designates, from the plurality of terminals; and a collecting device which is placed at a collecting place for collecting the terminals provided to users, and carries out processing for collecting terminals which are returned by the users; wherein the providing device comprises a memory which stores information concerning the plurality of terminals which are placed at the providing place, a specifying unit which specifies a terminal which comprises the application software that the user designated, applying the information that said memory stores, and a presenting unit which presents to the user, the terminal specified by the specifying unit.

According to this invention, terminals can be provided to users only when it is necessary for the users.

The collecting device may comprise:

a determining unit which determines whether the user who received providing of the terminal and the user who returns the terminal is the same; and a collecting unit that carries out processing for collecting the terminal in a case where it is determined that the user is the same, and stops the processing for collecting the terminal in a case where it is determined that the user is not the same.

The collecting device may comprise a deleting unit which deletes data that is stored in the returned terminal.

The terminal providing system may further comprise an output device which is provided at the collecting place, and outputs data that is stored in the returned terminal, wherein data stored in the terminal may be possible to be output only via the output device.

The output device may comprise at least one of a printer that prints data to paper, a recorder that records data to a recording medium, and a sending device that sends data to external terminals via a communication network.

The terminal providing system may further comprise a charging device which charges the user according to the amount of data output via the output device.

The terminal providing system may further comprise a management device which manages the providing situation of the plurality of terminals, wherein the management device may comprise a reservation reception unit which receives reservation of terminals.

The management device may comprise a charging unit which obtains a utility fee of the terminal, based on at least one of, the model of terminal, kind of application software the terminal has, and the utility time of the terminal.

A terminal providing system according to a second aspect of the present invention includes:

a plurality of terminals which are placed to each of a plurality of providing/collecting places, which are provided to a plurality of stations of vehicles, for providing terminals to users and collecting the terminals that are returned by the users, and that include one ore more application software; and a plurality of providing/collecting devices which are placed at the plurality of providing/collecting places;

wherein each of the plurality of providing/collecting devices comprise a providing unit which carries out processing for providing to a user, a terminal that has the application software that the user designates, and a collecting unit which carries out processing for collecting the terminal that is returned from the user.

The providing/collecting device may comprise a determining unit which determines whether the user who is provided the terminal is the same as the user who is returning the terminal, and the collecting unit may carry out processing for collecting the terminal in a case where the determining unit determines that the user is the same, and may stop the processing for collecting the terminal in a case where the determining unit determines that the user is not the same.

The providing/collecting device may comprise a deleting unit which deletes data stored in the returned terminal.

The terminal providing system may further comprise a plurality of output devices which are placed at the plurality of providing/collecting places, and output data that are stored in the returned terminals, wherein data stored in the terminal may be possible to be output, only via the plurality of output devices.

Each of the output devices may comprise at least one of a printer that prints data to paper, a recorder that records data to a recording medium, and a sending device that sends data to external terminals via a communication network.

The terminal providing system may further comprise a charging device which charges the user of the utility fee in accordance with the amount of data output via the plurality of output devices.

The terminal providing system may further comprise a management device which manages the providing situation of the plurality of terminal, wherein the management device mat comprise a reservation reception unit which receives reservation of terminals.

The management device may comprise a first specifying unit which specifies a terminal that has the application software that the user designates, from the terminals which are placed at the station where the user is to ride a vehicle, wherein the reservation reception unit may receive reservation of the terminal specified by the first specifying unit.

The management device may comprise a time and date obtaining unit which obtains a possible time and date when the terminal provided to the user becomes possible to be provided to another user, by applying a time table that shows the arrival and departure time of each station of the vehicles.

The management device may comprise a second specifying unit which specifies terminals in which the possible time and date is before the time and date that the user rides the vehicle, from the terminals placed at the station where the user is to ride the vehicle, wherein the first specifying unit may specify the terminal that comprises the application software that the user designated, from the terminals specified by the second specifying unit.

The management device may comprise a charging unit which obtains a utility fee of the terminal, based on at least one of, the model of terminal, kind of application software the terminal has, and the utility time of the terminal.

The terminal providing system may further comprise an electric power unit which is provided at the seat of the vehicle, and provides electric power to terminal, wherein the terminal may be possible to be provided electric power, only from the electric power unit.

The electric power unit may comprise an indicator which indicates the remaining amount of electric power that is possible to be provided.

The electric power unit may provide electric power to the terminal, in accordance with amount of money paid by the user.

A terminal providing device according to a third aspect of the present invention, is characterized in that the terminal providing device is provided at a providing place for providing terminals to users, and comprises:

a memory which stores information concerning a plurality of terminals that comprise one or more application software;

a specifying unit which specifies a terminal which comprise the application software that is designated by a user, by applying information that said memory stores; and a presenting unit which presents to the user the terminal specified by the specifying unit.

A terminal management device according to a fourth aspect of the present invention, is characterized in that the terminal management device is placed in each of a plurality of providing/collecting places provided at a plurality of stations of vehicles, to provide terminals to users and collect terminals returned by the users, manages the providing situation of a plurality of terminals for carrying out processing for providing terminals to users, including one or more application software, and comprises:

a first specifying unit which specifies a terminal that comprise an application software that a user designated from the terminals that are placed at stations where the user rides said vehicle; and a reservation receiving unit which receives reservation of the terminal that is specified by the first specifying unit.

The terminal management device may further comprise a time and date obtaining unit which obtains a possible time and date when the terminal provided to the user becomes possible to be provided to another user, by applying a time table that shows the arrival and departure time of each station of the vehicles.

The terminal management device may further comprise a second specifying unit which specifies terminals in which the possible time and date is before the time and date that the user rides the vehicle, from the terminals placed at the station where the user is to ride the vehicle, wherein the first specifying unit may specify the terminal that comprises the application software that the user designated, from the terminals specified by the second specifying unit.

A terminal providing method according to a fifth aspect of the present invention is characterized by comprising:

a providing step of providing a terminal to the user; and a collecting step of collecting the terminal that is returned by the user, wherein the providing step comprises an application software designated by the user, from a plurality of terminals that comprise one or more application software, and a presenting step of presenting the specified terminal to the user.

The plurality of terminals may be respectively placed at a plurality of stations of vehicles, wherein the specifying step comprises a first step of specifying the terminal that comprise the application software that is designated by the user, from the terminals that are respectively placed at a plurality of stations where the user rides the vehicle.

The terminal providing method may further comprise a time and date obtaining step of obtaining a possible time and date when the terminal provided to the user becomes possible to be provided to another user, by applying a time table that shows the arrival and departure time of each station of the vehicles.

The specifying step may comprise a second step of specifying terminals in which the possible time and date is before the time and date that the user rides said vehicle, from the terminals placed at the station where the user is to ride the vehicle, wherein the first step may comprise a step of specifying the terminal that comprises the application software that the user designated, from the terminals specified by the second step.

A computer readable recording medium that stores a program to function as a terminal providing device according to a sixth aspect of the present invention is characterized in that the terminal providing device is provided at a providing place for providing terminals to users, and comprises:

a memory which stores information concerning a plurality of terminals that comprise one or more application software; and a specifying unit which specifies the terminal which comprise an application software that is designated by the user, by applying information that said memory stores; and a presenting unit which presents to the user, the terminal specified by the specifying unit.

A computer readable recording medium that stores a program to function as a terminal providing device according to a seventh aspect of the present invention is characterized in that the terminal management device manages the providing situation of a plurality of terminals for carrying out processing for providing terminals to users, including one or more application software, which are placed at each of a plurality of providing/collecting places, which are provided to a plurality of stations of vehicles, for providing terminals to users and collecting the terminals that are returned by the users; and comprises:

a first specifying unit which specifies a terminal that has an application software that a user designates, from the terminals that are placed at a station where the user is to ride a vehicle; and a reservation reception unit which receives reservation of the terminal specified by the first specifying unit.

A program to function a computer as a terminal providing device according to an eighth aspect of the present invention, is characterized in that the terminal providing device is provided at a providing place for providing terminals to users, and comprises:

a memory which stores information concerning a plurality of terminals that comprise one or more application software; and a specifying unit which specifies a terminal that comprise an application software that is designated by a user, by applying information that said memory stores; and a presenting unit which presents to the user, the terminal specified by the specifying unit.

A program to function a computer as a terminal management device according to a ninth aspect of the present invention, is characterized in that the terminal management device manages the providing situation of a plurality of terminals for carrying out processing for providing terminals to users, including one or more application software, which are placed at each of a plurality of providing/collecting places, which are provided to a plurality of stations of vehicles, for providing terminals to users and collecting the terminals that are returned by the users, and comprises:

a first specifying unit which specifies a terminal that has an application software that a user designates, from the terminals which are placed at the station where the user is to ride a vehicle; and a reservation reception unit which receives reservation of the terminal specified by the first specifying unit.

BRIEF DESCRIPTION OF DRAWINGS

FIG. 2A is a structure diagram of a management device that structures the terminal lending system in FIG. 1, FIG. 2B is a diagram showing a management table that is stored by a database that the management device comprises, and FIG. 2C is a diagram showing a user information table that the database stores.

FIG. 8A is a diagram showing a management table that is stored by the database that the management device that structures the terminal lending system in FIG. 7 comprises, FIG. 8B is a diagram showing a reserving person table that the database stores, and FIG. 8C is a diagram showing a lending table that a storing unit of a providing terminal that structures the terminal lending system in FIG. 7 stores.

FIG. 12A is a diagram showing a management table stored by a database that a management device that structures the terminal lending system in FIG. 11 comprises, and FIG. 12B is a diagram showing a time table that the database stores.

BEST MODE FOR CARRYING OUT THE INVENTION

First Embodiment

Next, a terminal lending system according to a first embodiment of the present invention will be described with reference to the drawings.

Figure 1:
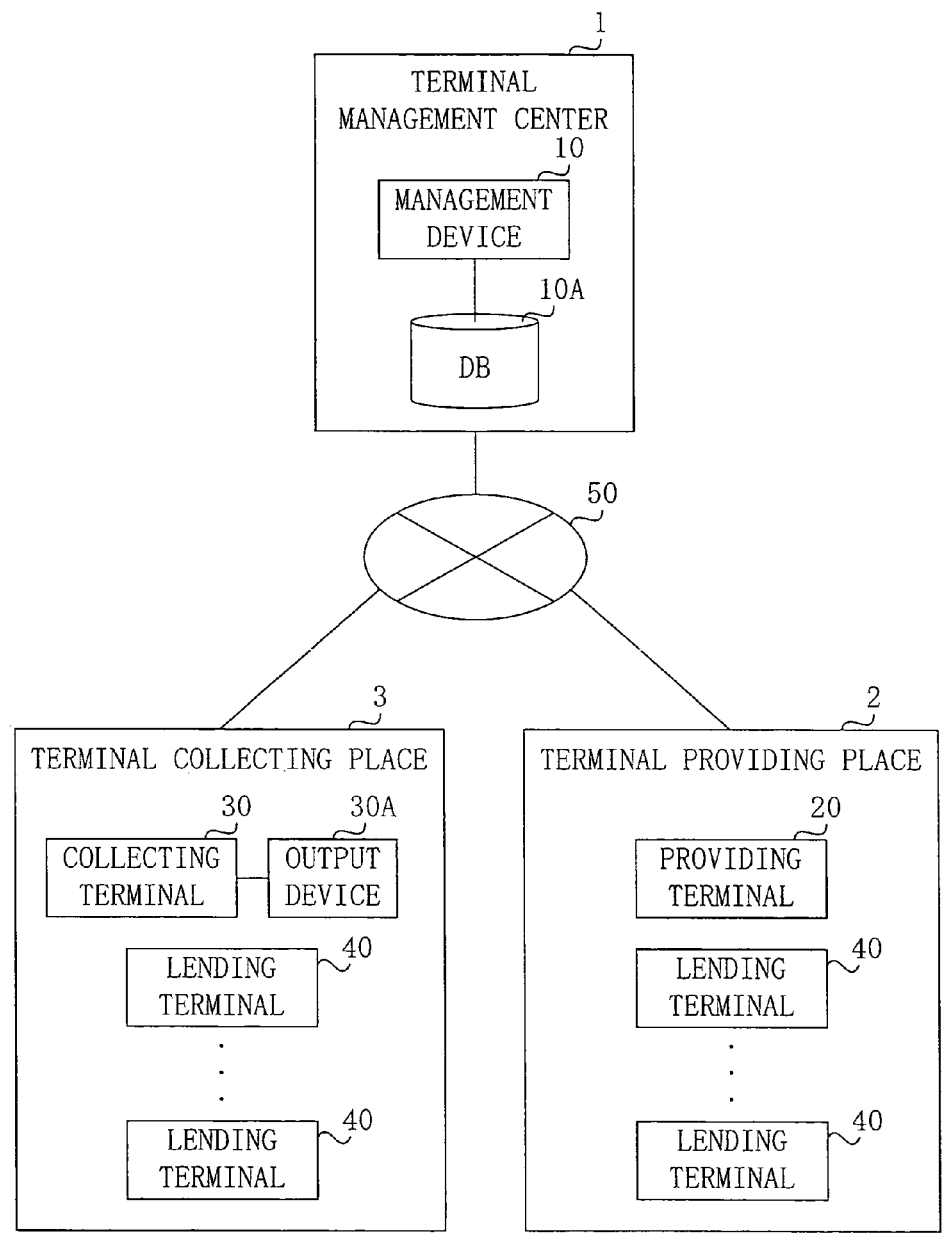
FIG. 1 is a structure diagram showing a terminal lending system according to a first embodiment.

As shown in FIG. 1, the terminal lending system according to the first embodiment is constituted of a management device 10, a providing terminal 20, a collecting terminal 30, an output device 30A, a plurality of lending terminals 40, and a network 50.

The management device 10 is provided at a terminal management center 1. The management device 10 manages the plurality of lending terminals 40, applying information concerning the plurality of lending terminals 40, stored in a database (DB) 10A.

The providing terminal 20 is provided in a terminal providing place 2. A plurality of lending terminals 40 are placed at the terminal providing place 2, and the providing terminal 20 carries out a lending processing for lending the lending terminals 40 to the users.

The collecting terminal 30 is provided at a terminal collecting place 3. The lent lending terminals 40 are returned to the terminal collecting place 3. The collecting terminal 30 carries out a returning processing for collecting the lending terminal 40 returned by the user. The collecting terminal 30 outputs data that the user collected or created applying the lending terminal, to the output device 30A.

The output device 30A is a printer, a recording device that records information to recording mediums (flexible disk, compact disk, or semiconductor memories, etc.), or a sending device that sends data to other terminals via the network 50. The output device 30A prints on paper, stores to recording mediums, and sends to other terminals, data provided from the collecting terminal 30, according to the control of the collecting terminal 30.

The plurality of lending terminals 40 are portable terminals, such as a notebook computer or a PDA (Personal Digital Assistant). The plurality of lending terminals 40 each comprise different kinds and numbers of application software (word-processing software, spreadsheet software, e-mail software, and Web browser, etc.). A user borrows a lending terminal 40 that has installed the application software that he/she needs, at the terminal providing place 2. By this, the user can collect various information and create documents, applying a lending terminal 40, at the place that he/she is out or at the time of transferring to a destination.

Each lending terminal 40 may be connected only to the collecting terminal 40 via a dedicated cable. By doing so, data that is stored in the lending terminal 40 is possible to be output only via the output device 30A provided at the terminal collecting place 3. Therefore, a high rate of collection of the lending terminals 40 can be realized.

Next, detailed structure of the management device 10 will be described.

As shown in FIG. 2A, the management device 10 is constituted of a sending/receiving unit 11, a storing unit 12, and a control unit 13.

The sending/receiving unit 11 is connected by using a cable or by radio to a network 50 that is constituted of wireless communication network and Internet, etc. The sending/receiving unit 11 intermediates sending/receiving of data (information) between the control unit 13 and other terminals via the network 50.

The storing unit 12 is constituted of a hard disk, a RAM (Random Access Memory), and a ROM (Read Only Memory), and stores programs and data for operating the management device 10.

The control unit 13 is constituted of a CPU (Central Processing Unit), and operates according to the program that the storing unit 12 stores. For example, the control unit 13 manages lending situation, etc. of the plurality of lending terminals 40, applying the information that is stored in the database 10A. The control unit 13 carries out a charging processing that will be described later on, applying the information that is stored in the database 10A.

The database 10A is stored in an external storage device (not shown) that is connected to the management device 10 or the storing unit 12. The database 10A stores for example a management table shown in FIG. 2B and a user information table shown in FIG. 2C.

As shown in FIG. 2B, the management table stores correlating, terminal information of the lending terminals 40, lending situation of the lending terminals 40, and information of the users who are borrowing a lending terminal 40, with each other.

As shown in FIG. 2C, the user information table stores corresponding, information of the users who borrowed the lending terminals 40, terminal information of the lending terminals 40 that the users borrowed, lending time and date, and returning time and date, with each other.

Terminal information shows a terminal ID for identifying the lending terminal 40, model of the lending terminal 40, and a kind (name) of application software that is installed to the lending terminal 40. User information shows the name of the user, address, telephone number, e-mail address, and the credit card number that the user has.

Next, detailed structure of the providing terminal 20 will be described.

Figures 3A, 3B:
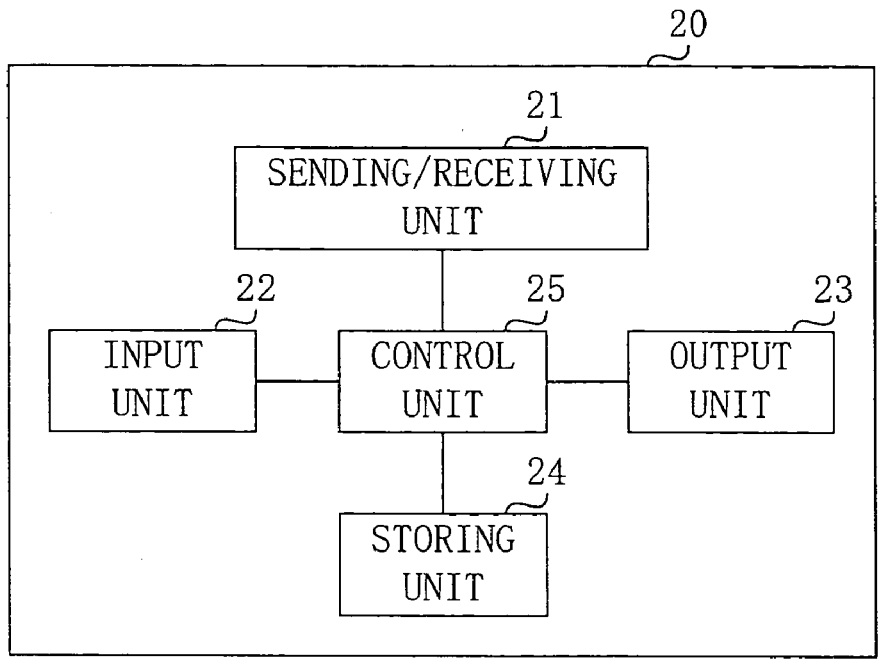
FIG. 3A is a structure diagram of a providing terminal that structures the terminal lending system in FIG. 1.
FIG. 3B is a diagram showing a lending table stored by a storing unit that structures providing terminal.

As shown in FIG. 3A, the providing terminal 20 is constituted of a sending/receiving unit 21, an input unit 22, an output unit 23, a storing unit 24, and a control unit 25.

The sending/receiving unit 21 is connected to the network 50 by using cable or by radio, and intermediates sending/receiving of data (information) between control unit 25 and the management device 10.

The input unit 22 comprises at least one input means, such as a keyboard, a mouse, a touch panel, or a bar-code reader, etc., and is operated by an operator of the providing terminal 20. The input unit 22 inputs the terminal ID of the lending terminal 40 that is to be lent and information concerning the user who borrows the lending terminal 40, etc., to the control unit 25.

The output unit 23 comprises a display, etc., and displays terminal information of the lending terminals 40 that are placed in the terminal providing place 2.

The storing unit 24 is constituted of a hard disk, a RAM, or a ROM, and stores programs and data for operating the providing terminal 20. For example, the storing unit 24 stores a lending table shown in FIG. 3B.

As shown in FIG. 3B, the lending table stores terminal information of the lending terminals 40 that are placed in the terminal providing place 2.

The control unit 25 is constituted of a CPU, and operates according to the programs that the storing unit 24 stores. For example, the control unit 25 controls the output unit 23 to display the terminal information of the lending terminals 40 at the terminal providing place 2. The control unit 25 lends the lending terminals 40 to the users by carrying out the lending processing that will be later described. The control unit 25 sends the information of the lent lending terminal 40 and information of the user who borrowed the lending terminal 40 via the sending/receiving unit 21, to the management device 10.

Next, detailed structure of the collecting terminal 30 will be described.

Figure 4:
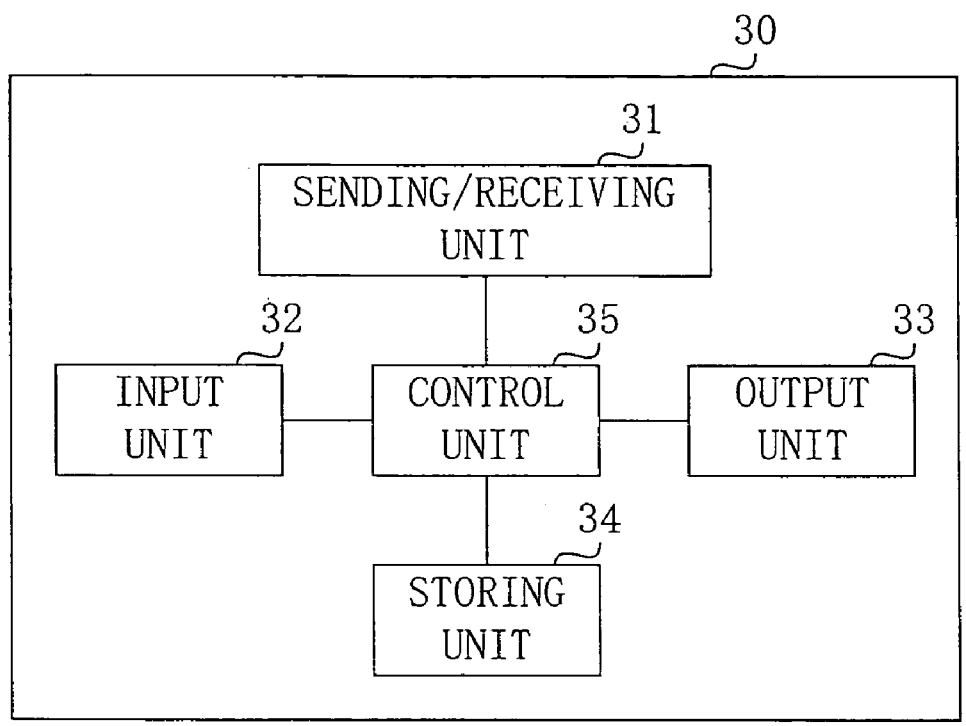
FIG. 4 is a structure diagram of a collecting terminal that structures the terminal lending system in FIG. 1.

As shown in FIG. 4, the collecting terminal 30 is constituted of a sending/receiving unit 31, an input unit 32, an output unit 33, a storing unit 34, and control unit 35.

The sending/receiving unit 31 is connected to the network 50 by using a cable, or by radio, and intermediates the sending/receiving of data (information) between the control unit 35 and the management device 10.

The input unit 32 comprises at least one input means, such as a keyboard, a mouse, a touch panel, or a bar code reader, etc., and is operated by an operator of the collecting terminal 30. The input unit 32 inputs terminal ID of the lending terminal 40 that is to be returned and information concerning the user who returns the lending terminal 40, to the control unit 35, in accordance with the operation of the operator.

The output unit 33 comprises a display, etc., and displays terminal information of the lending terminal 40 that is to be returned.

The storing unit 34 is constituted of a hard disk, a RAM, and a ROM, and stores programs and data for operating the collecting terminal 30.

The control unit 35 is constituted of a CPU, and operates according to the programs that the storing unit 34 stores. For example, the control unit 35 collects the lending terminals 40 by carrying out returning processing that will be later described. The control unit 35 sends information concerning the collected lending terminals 40 via the sending/receiving unit 31, to the management device 10.

Next, operations of the terminal lending system according to the first embodiment, will be described.

A user goes to the terminal providing place 2 to borrow a lending terminal 40, and carries out a predetermined lending procedure.

In the lending procedure, the user presents identification to an operator of the providing terminal 20, and provides information of him/herself (name, address, telephone number, and credit card number, etc.), to the operator. Then, the user designates the kind of application software that he/she will use.

The operator at the terminal providing place 2 confirms the identity of the user by the presented identification. Then, the operator operates the input unit 22 of the providing terminal 20, to input provided information of the user and the designated kind of application software, to the control unit 25.

The input unit 22 in response to the operation of the operator, inputs the input user information, and a designation signal indicating the designated kind of application software, to the control unit 25.

Figure 5:
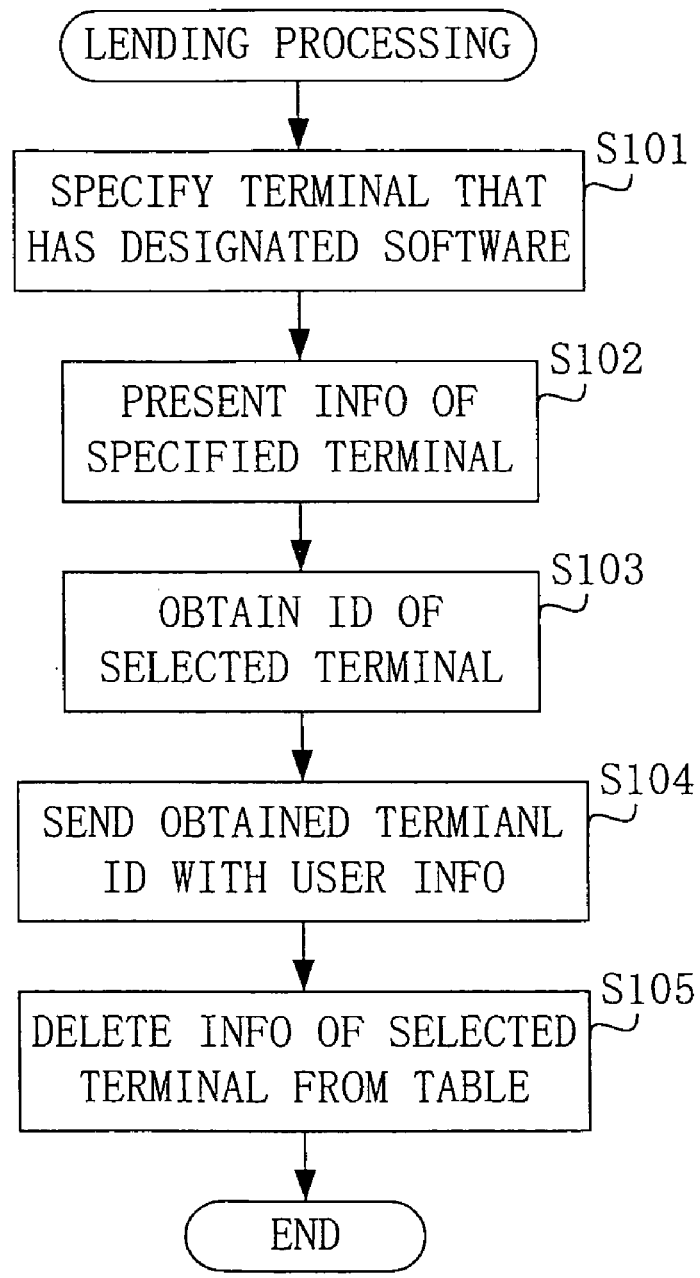
FIG. 5 is a flowchart showing a lending processing carried out by a control unit that structures the providing terminal in FIG. 3A.

The control unit 25 starts the lending processing shown in FIG. 5, according to the program stored in the storing unit 24, in response to the user information and the designation signal provided by the input unit 22.

First, the control unit 25 searches the lending table that the storing unit 24 stores, and specifies the lending terminals 40 that have the application software of the kind shown by the designation signal provided from the input unit 22 (Step S101).

Then, the control unit 25 presents the terminal information of the specified lending terminals 40 (Step S102). Concretely, the control unit 25 controls the output unit 23, and displays the model of the specified lending terminals 40 and kind of application software that are installed.

The user selects the lending terminal 40 that he/she will use, from the displayed lending terminals 40. The operator operates the input unit 22, and inputs the selection result of the user, and lends the lending terminal 40 that the user selected.

The input unit 22 inputs a selection signal that indicates the lending terminal 40 that the user selected, according to the operation of the operator.

The control unit 25 obtains the terminal ID of the lending terminal 40 that the selection signal indicates, from the lending table of the storing unit 24, in response to the selection signal provided by the input unit 22, and (Step S103).

Sequentially, the control unit 25 sends the obtained terminal ID with the user information provided by the input unit 22, to the management device 10 via the sending/receiving unit 21 (Step S 104).

Then, the control unit 25 controls the storing unit 24, deletes terminal information of the lending terminal 40 that the user selected (Step S105), and finishes the lending processing.

By carrying out the above lending processing, the users can borrow the lending terminals 40 that have installed the requested application software.

On the other hand, the control unit 13 of the management device 10 updates information stored in the management table of the database 10A, according to the program that the storing unit 12 stores, in response to the terminal ID and user information provided by the providing terminal 20.

Concretely, the control unit 13 changes the lending situation of the lending terminal 40 that is specified by the provided terminal ID, from "not lent" to "lending". The control unit 13 stores the provided user information, corresponding it with the provided terminal ID to the management table.

The control unit 13 corresponds the provided user information to the terminal information of the lending terminal 40 that is specified by the provided terminal ID, and stores the information to the user information table of the database 10A.

Furthermore, the control unit 13 stores the date and time that the terminal ID and user information is provided as the lending date and time of the lending terminal 40, corresponding it with the provided user information to the user information table.

The user collects necessary information, and creates necessary data, applying the application software that the lending terminal 40 comprises.

Thereafter, the user goes to the terminal collecting place 3 to return the lending terminal 40, and carries out the predetermined returning procedure.

In the returning procedure, the user presents for example an identification to the operator of the collecting terminal 30, and provides information of him/herself (name, address, and telephone number, etc.) to the operator.

The lending terminal 40 that is a target for returning, is connected to the collecting terminal 30 by a dedicated cable, etc.

The operator of the terminal collecting place 3 confirms the identity of the user by the presented identification. Then, the operator operates the input unit 32 of the collecting terminal 30, to input provided information of the user and the terminal ID of the lending terminal 40 that is to be returned.

Here, the operator for example, operates the keyboard of the input unit 32, to input the terminal ID of the lending terminal 40 that is to be returned. Or, the operator reads the bar code indicating the terminal ID that is attached to the lending terminal 40 that is to be returned, by applying a bar code reader that the input unit 32 comprises.

The input unit 32 inputs user information and terminal ID to the control unit 35, in response to the operation of the operator.

Figure 6:
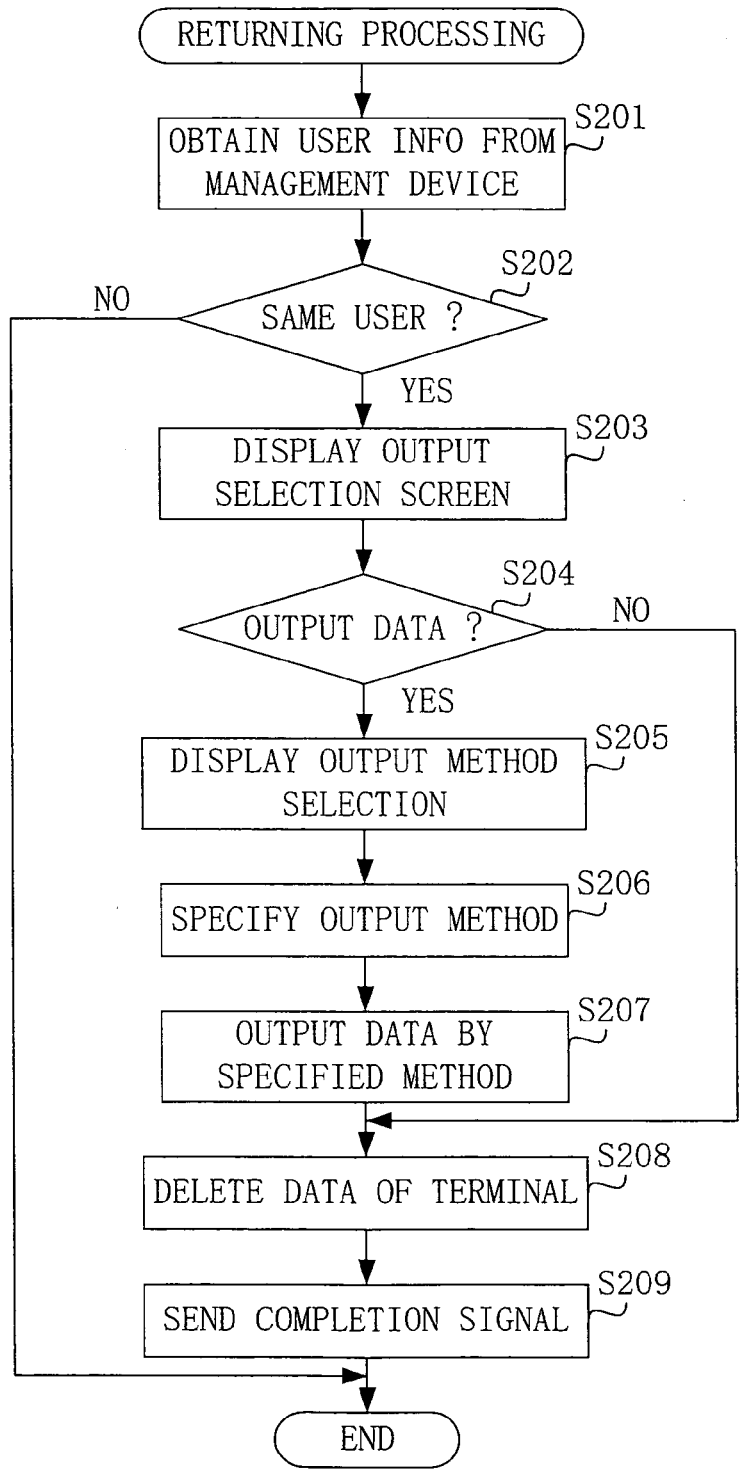
FIG. 6 is a flowchart showing a returning processing carried out by a control unit that structures the collecting terminal in FIG. 4.

The control unit 35 starts the returning processing shown in FIG. 6, according to the program that the storing unit 34 stores, in response to the user information and terminal ID provided by the input unit 32, and.

First, the control unit 35 obtains the information of the user who is to return the lending terminal 40, from the management device 10 (Step S201). Concretely, the control unit 35 sends a providing signal that instructs providing of user information, with the terminal ID provided by the input unit 32, to the management device 10.

The control unit 13 of the management device 10 obtains user information that is correlated with the terminal ID that is provided with the providing signal, from the management table of the database 10A, in response to the providing signal provided by the collecting terminal 30. Then, the control unit 13 sends the obtained user information to the collecting terminal 30 via the sending/receiving unit 11.

The control unit 35 of the collecting terminal 30 determines whether the user who borrowed the lending terminal 40 and the user who returned the lending terminal 40 is the same, in response to the user information that is provided by the collecting terminal 30. (Step S202). Concretely, the control unit 35 determines whether the content of the user information that is provided by the input unit 32 matches with the content of the user information that is provided by the management device 10.

In a case where it is determined that the content of the user information does not match, namely, in a case where it is determined that the user who borrowed and the user who is returning is not the same, (Step S202; NO) the control unit 35 ends the returning processing. By this, unauthorized use of the lending terminals 40 and damage that the users suffer by the lending terminals 40 being stolen, etc., can be prevented.

On the other hand, in a case where it is determined that the contents of the user information match, namely, in a case where it is determined that the user who borrowed the lending terminal 40 and the user who returned the lending terminal 40 is the same (Step S202; YES), the control unit 35 controls the output unit 33, to display an output selection screen for selecting whether to output data or not (Step S203). By this, the control unit 35 has the user select whether to output data that is stored in the lending terminal 40, or not.

After the user has selected whether to output data of the lending terminal 40 or not, the operator of the collecting terminal 30 inputs a selection result of the user, operating the input unit 32. The input unit 32 inputs the selection result of the user to the control unit 35, in response to the operator's operation.

The control unit 35 determines whether to output data that is stored in the lending terminal 40 or not, based on the provided selection result, in response to the selection result of the user, provided by the input unit 32 (Step S204).

In a case where it is determined that data is not to be output (Step S204; NO), the control unit 35 carries out the processing of Step S208, that will be later described.

On the other hand, in a case where it is determined that data is to be output (Step S204; YES), the control unit 35 controls the output unit 33, to display an output method selection screen for selecting the output method of data (Step S205). By this, the control unit 35 has the user select the output method (printing to paper, storing to a recording medium, and sending to another terminal), of the data that is stored in the lending terminal 40.

After the user selects an output form of data, the operator of the collecting terminal 30 operates the input unit 32, and inputs a selection result of the user. The input unit 32 inputs the selection result of the user to the control unit 35, in response to the operation of the operator.

The control unit 35 specifies the output method of data, based on the provided selection result, in response to the selection result of the user, provided from the input unit 32 (Step S206).

The control unit 35 outputs data that is stored in the lending terminal 40, controlling the output device 30A that is connected to the collecting terminal, according to the specified output method (Step S207).

The control unit 35 deletes the data that is stored in the lending terminal 40, controlling the returned lending terminal 40 (Step S208).

The control unit 35 sends a completion signal that shows that the returning processing is finished, together with the terminal ID of the returned lending terminal 40 to the management device 10, and completes the returning processing (Step S209).

The control unit 13 of the management device 10 updates information that is stored in the management table and user information table of the database 10A, in response to the completion signal that is provided by the collecting terminal 30.

Concretely, the control unit 13 changes the lending situation of the lending terminal 40 that is specified by the terminal ID, provided together with the completion signal, from "lending" to "returned".

The control unit 13 identifies information of the user who returned the lending terminal 40, by applying the management table and provided terminal ID. Then, the control unit 13 stores to the user information table, the date and time that the completion signal is provided, as the returned time and date of the lending terminal, corresponding the time and date with information of the specified user.

Thereafter, the control unit 13 deletes the user information that is correlated with the provided terminal ID, from the management table.

The control unit 13 of the management device 10 carries out charging processing of below, applying the user information table of the database 10A, at a predetermined date and time (for example, midnight at the end of the month), according to the programs that the storing unit 12 stores.

First, the control unit 13 obtains the difference between each lending date and time and each returned time and date, stored in the user information table. By this, the control unit 13 obtains each utility time of the lending terminals 40.

Sequentially, the control unit 13 obtains the model of the lending terminal 40, the kind of application software, and a utility fee corresponding to the utility time, according to each user, based on a predetermined rule.

The control unit 13 accesses to servers of banking establishments (banks, credit card companies, etc.), via the network 50, and makes settlements of the obtained utility fee, by applying the credit card number of each user, which is stored in the user information table.

In the above description, an embodiment where one terminal providing place 2 (providing terminal 20) and one terminal collecting place 30 (collecting terminal 30) are provided was shown. However, a plurality of terminal providing places 2 (providing terminals 20) and terminal collecting places 3 (collecting terminals 30) may be placed in various places.

By doing so, the user can borrow a lending terminal 40 at a terminal providing place 2 that is placed near the travel destination or business trip destination, without the user bringing a portable computer from his/her house or company. By this, the user can search periphery information of the travel destination, and send images photographed by a digital camera to a friend by e-mail, etc. Additionally, the user can create documents while transferring to a business trip destination, and send created documents to companies by e-mail.

Second Embodiment

Next, the terminal lending system according to a second embodiment of the present invention will be described with reference to the drawings.

In the terminal lending system according to the second embodiment, a user can reserve a lending terminal 40.

Figure 7:
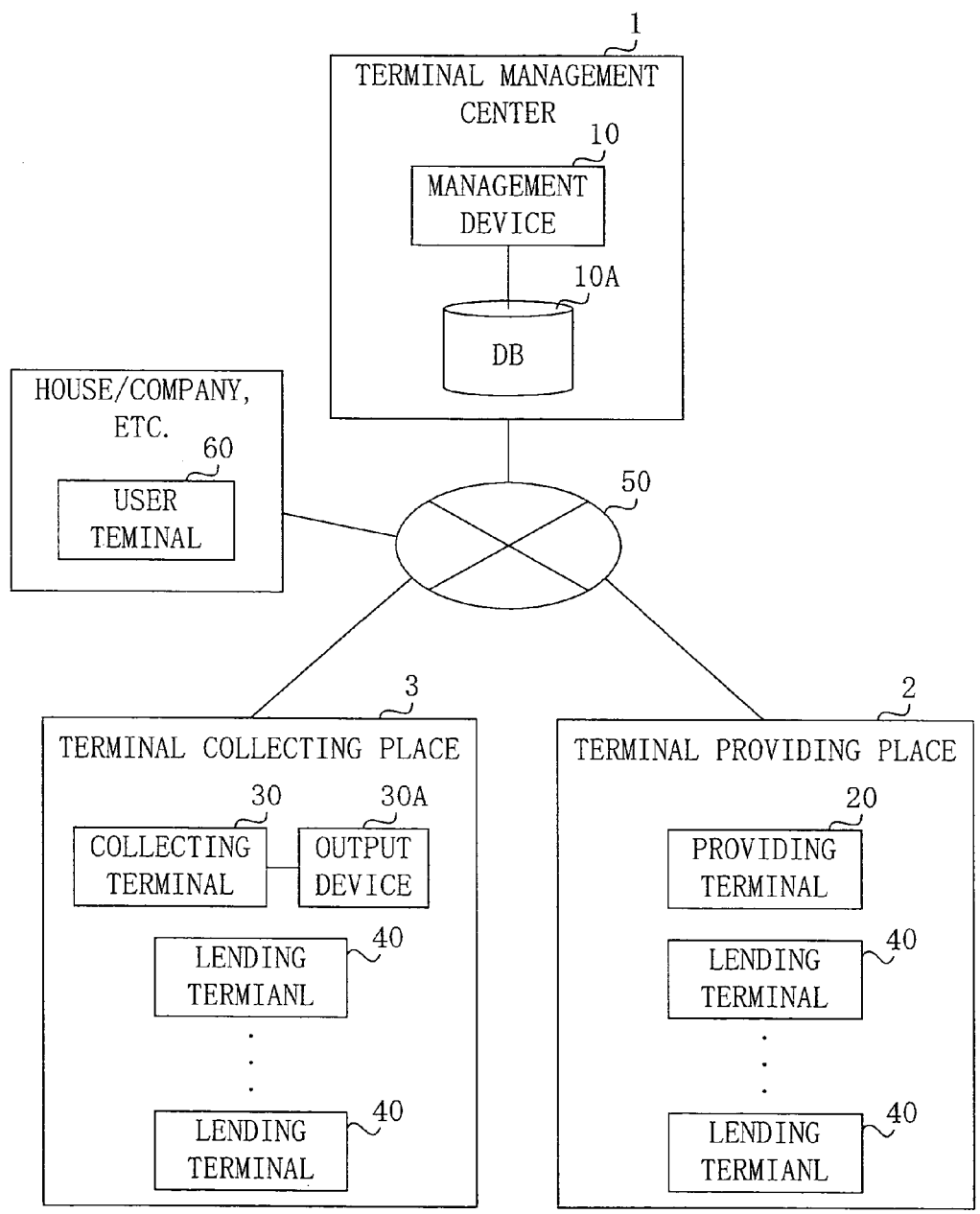
FIG. 7 is a structure diagram of a terminal lending system according to a second embodiment.

As shown in FIG. 7, in the terminal lending system according to the second embodiment, a user terminal 60 is added to the structure shown in the first embodiment.

The user terminal 60 is a computer or a mobile phone, etc., that comprises an input key and a display, etc., and is connected to the network 50 by using cable or by radio. The user terminal 60 requests to the management device 10, reservation of a lending terminal 40, according to the operation of the user.

The database 10A that the management device 10 comprises, stores a management table, a user information table, and a reserving person table.

As shown in FIG. 8A, the management table stores information of the reservation situation of the lending terminals 40, in addition to the terminal information and user information shown in the first embodiment.

The user information table is substantially the same as the user information able shown in the first embodiment.

As shown in FIG. 8B, the reserving person table stores corresponding with each other, information of a user who reserved (reserving person) the lending terminal 40, terminal ID of the lending terminal that the user reserved, and a reservation code for specifying the reserving person and the reserved lending terminal 40.

The management device 10 manages the lending situation and reservation situation of the plurality of lending terminals 40, by applying the management table of the database 10A.

In the storing unit 24 of the providing terminal 20, a lending table, as shown in FIG. 8C, is stored. As shown in FIG. 8C, the lending table stores the reservation situation of the lending terminals 40, in addition with the information shown in the first embodiment.

The structure of the terminal lending system other than the above, is substantially the same as the first embodiment.

Next, operation of the terminal lending system according to the second embodiment, will be described.

In a case where a lending terminal 40 is to be reserved, a user accesses to he management device 10, applying the user terminal 60, at his/her house or company. The user operates the user terminal 60, to request reservation of a lending terminal 40, to the management terminal 10.

The user terminal 60 accesses to the management device 10, and sends a reservation signal that requests reservation of a lending terminal 40, according to the user's operation.

Figure 9:
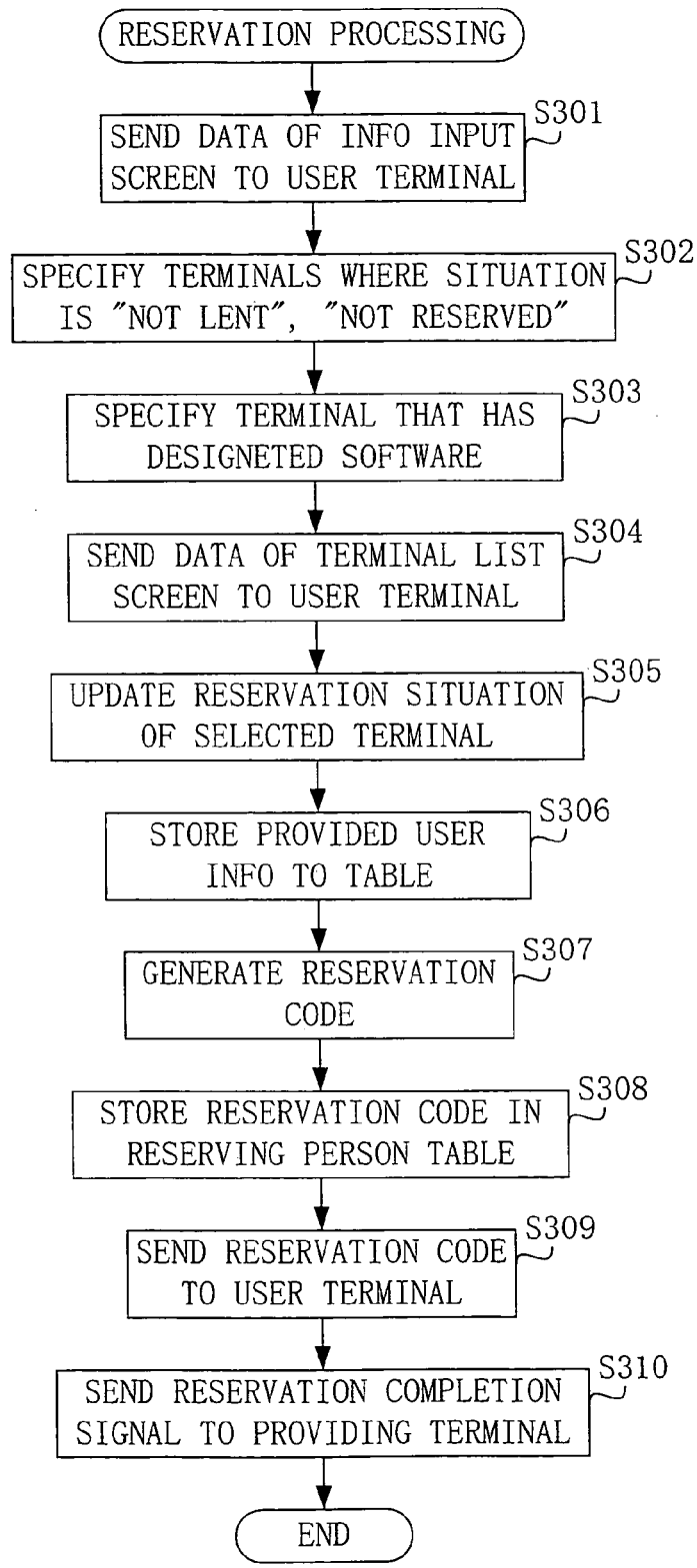
FIG. 9 is a flowchart showing a reservation processing carried out by a control unit of the management device.

The control unit 13 of the management device 10 starts reservation processing shown in FIG. 9, according to the programs that the storing unit 12 stores, responds to the reservation signal that is provided from the user terminal 60.

First, the control unit 13 sends data of an information inputting screen for inputting user information and kind (name) of application software that the user will use, to the user terminal 60 via the network 50 (Step S301).

The user terminal 60 displays an information inputting screen that is shown by the provided data, in response to the data that is provided by the management device 10.

The user operates the user terminal 60, to input his/her own information (name, address, phone number, and credit card number, etc.) to the displayed information inputting screen, and designates the kind of application software that he/she will use.

The user terminal 60 sends the input user information and designation information that shows the designated kind of application software to the management device 10, via the network 50, in accordance with the user's operation.

The control unit 13 of the management device 10 searches the management table of the database 100A, and specifies the lending terminals 40, in which the lending situation is "not lent" and the reservation situation is "not reserved", in response to the user information and designation information provided by the user terminal 60 (Step S302).

Sequentially, the control unit 13 specifies lending terminals 40 that have the application software, indicated by the provided designation information, from the specified lending terminals 40 (Step S303).

The control unit 13 generates data of a terminal list screen that shows the terminal information of the specified lending terminals 40, and sends the data to the user terminal 60 via the network 50 (Step S304). By this, the control unit 13 has the user select a lending terminal 40 that is to be reserved, from the specified lending terminals 40.

The user terminal 60 displays the terminal list screen, in response to the data that is provided by the management device 10. The user selects the lending terminal 40 that is to be reserved, from the lending terminals 40 that are shown on the terminal list screen, operating the user terminal 60.

The user terminal 60 sends to the management device 10, via the network 50, a selection signal that shows the terminal ID of the lending terminal 40 that the user selected, according to the user's operation.

The control unit 13 of the management device 10 updates the reservation situation of the lending terminal 40, stored in the management table of the database 10A, that is specified by the terminal ID shown by the provided selection signal, in response to the selection signal that is provided by the user terminal 60 (Step S305). Concretely, the control unit 13 re-writes the reservation situation of the lending terminal 40 that is specified by the provided terminal ID, from "not reserved" to "reserved".

Subsequently, the control unit 13 stores corresponding the user information provided by the user terminal 60 with the terminal ID that the selection signal indicates, to the management table and the reserving person table of the database 10A (Step S306).

Thereafter, the control unit 13 generates a reservation code for specifying the reserving person and the reserved lending terminal 40 (Step S307).

The control unit 13 stores the generated reservation code, corresponding it with the terminal ID of the reserved lending terminal 40, to the reserving person table of the database 10 (Step S308).

Subsequently, the control unit 13 sends the generated reservation code to the user terminal 60 via the network 50 (Step S309).

The user terminal 60 displays the provided reservation code, in response to the reservation code that is provided by the management device 10. As will be later described, the users borrow the reserved lending terminal 40, applying the reservation code that is provided by the management device 10.

The control unit 13 of the management device 10 sends to the providing terminal 20 via the network 50, a reservation completion signal that shows that a reservation is completed, together with the terminal ID of the reserved lending terminal 40 (Step S310), and completes the reservation processing.

The control unit 25 of the providing terminal 20, in response to the reservation completion signal that is provided by the management device 10, updates the reservation situation of the lending terminal 40, stored in the lending table of the storing unit 24, in which the lending terminal 40 is specified by the terminal ID, which is provided together with the reservation completion signal. Concretely, the control unit 25 re-writes the reservation situation of the lending terminal 40 that is specified by the providing terminal ID, from "not reserved" to "reserved".

Thus, the reservation of the lending terminal 40 is completed.

After completing the reservation procedure, the user goes to the terminal providing place 2, and carries out the predetermined lending procedure.

In the lending procedure, the user provides the reservation code provided by the management device 10 to the operator, together with presenting for example identification, to the operator of the providing terminal 20.

The operator of the terminal providing place 2 confirms the identity of the user by the presented identification. Then, the operator operates the input unit 22 of the providing terminal 20, to input the provided reservation code.

The input unit 22 inputs the reservation code to the control unit 25, in response to the operation of the operator.

Figure 10:
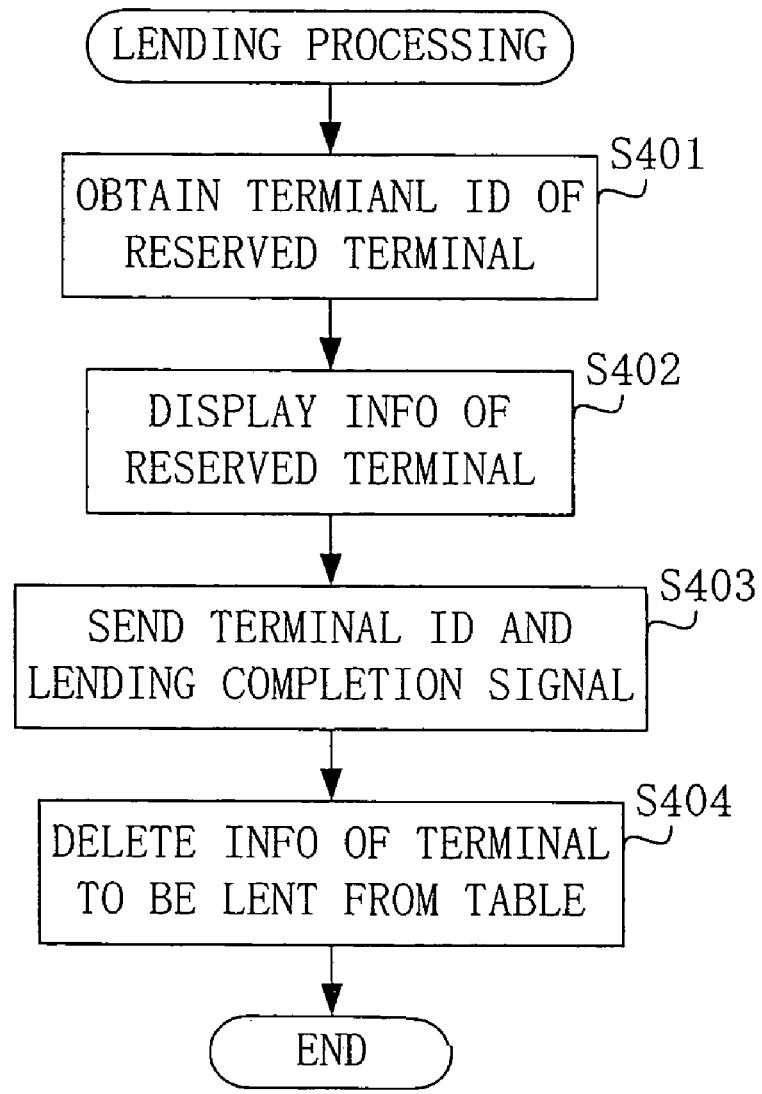
FIG. 10 is a flowchart showing a lending processing carried out by the control unit of the providing terminal.

The control unit 25 starts lending processing shown in FIG. 10, according to the program that the storing unit 24 stores, in response to the reservation code provided by the input unit 22.

First, the control unit 25 obtains the terminal ID of the lending terminal 40 that the user reserved, from the management device 10 (Step S401). Concretely, the control unit 25 sends to the management device 10 via the network 50, an ID requesting signal that requests providing of the terminal ID, together with the reservation code provided by the input unit 22.

The control unit 13 of the management device 10, in response to the ID requesting signal provided by the providing terminal 20, obtains the terminal ID that corresponds to the reservation code, provided together with the ID requesting signal, from the reserving person table of the database 10A. The control unit 13 sends the obtained terminal ID to the providing terminal 20 via the network 50.

The control unit 25 of the providing terminal 20, in response to the terminal ID provided from the management device 10, obtains information of the lending terminal 40 that is specified by the provided terminal ID, from the lending table. The control unit 25 displays the obtained terminal information, controlling the output unit 23 (Step S402).

The operator of the providing terminal 20 can specify the lending terminal 40 that is to be lent to the user, by the displayed terminal information.

Subsequently, the control unit 25 sends to the management device 10 via the sending/receiving unit 21, a lending completion signal that shows that the lending processing is completed, together with the terminal ID of the lending terminal 40 that is to be lent (Step S403).

The control unit 25 deletes the information of the lending terminal 40 that is to be lent to the user, from the lending table of the storing unit 24 (Step S404), and completes the lending processing.

The control unit 13 of the management device 10, in response to the lending completion signal that is provided by the providing terminal 20, updates the management table of the database 10A. Concretely, the control unit 13 re-writes the lending situation of the lending terminal 40 that is specified by the terminal ID, provided together with the lending completion signal, from "not-lent" to "lending", and the reservation situation from "reserved" to "not reserved".

The control unit 13 obtains user information that is correlated with the provided terminal ID from the reserving person table of the database 10A, and stores the information to the management table and the user information table, corresponding it with the provided terminal ID.

Sequentially, the control unit 13 deletes the information corresponding to the provided terminal ID, from the reservation table.

The control unit 13 further stores the date and time that the lending completion signal is provided, as the lending date and time of the lending terminal 40, to the user information table, corresponding the date and time with the provided terminal ID.

By the above processing, the user can borrow the lending terminal 40 that he/she reserved. Additionally, the user can collect and create various data, applying the borrowed lending terminal 40.

A user who hasn't reserved a lending terminal 40, as in the first embodiment, goes to the terminal providing place 2, and carries out the predetermined procedure. The control unit 25 of the providing terminal 20 lends the lending terminal 40 to the user, by performing substantially the same processing as the lending processing shown in the first embodiment.

However, in the processing of Step S101, the control unit 25 specifies the lending terminal 40 that comprises the designated application software, from the terminals, in which the reservation situation is "not reserved", applying the lending table shown in FIG. 8C. Operations other than this, is substantially the same as the first embodiment.

The processing when the user returns the lending terminal 40 is substantially the same as the first embodiment.

In the second embodiment also, many terminal providing places 2 (providing terminals 20) and terminal collecting places 3 (collecting terminals 30) may be placed in various places. As the above, by making reservation of the lending terminal 40 possible, providing of lending terminals 40 can be carried out smoothly. By this, a terminal lending system that can be easily used by the users, is realized.

Third Embodiment

Next, a terminal lending system according to a third embodiment will be described with reference to the drawings.

In a terminal lending system according to a third embodiment, a plurality of terminal providing/collecting places 7 for lending the lending terminals 40 to users, and collecting the lending terminals 40 that are returned by the users, are placed at train stations or near the stations. The user reserves a lending terminal 40, borrows the reserved lending terminal, at the station that the user rides the train, uses the lending terminal 40 in the train, and returns the lending terminal 40 at the station that the user gets off.

Figure 11:
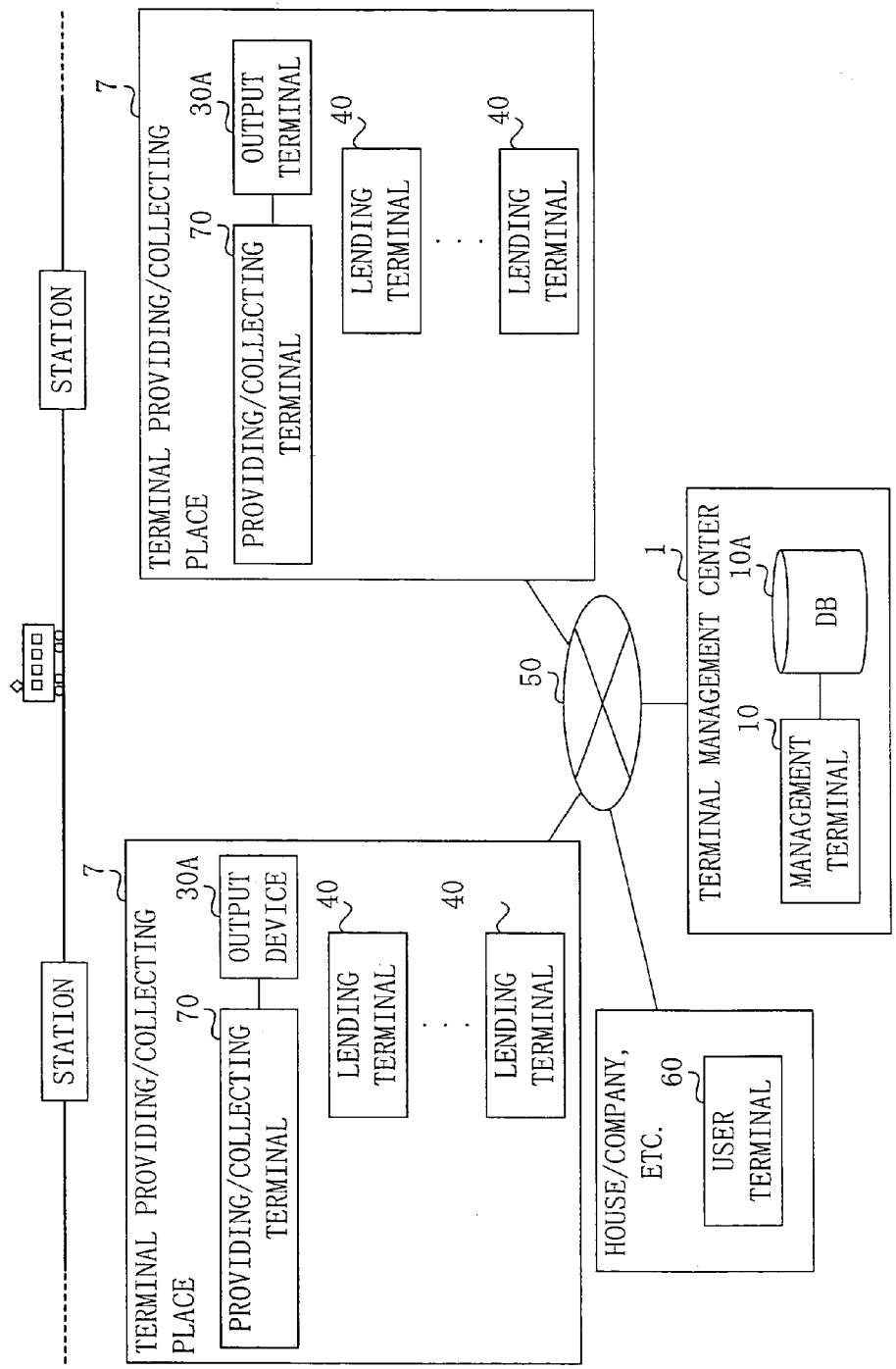
FIG. 11 is a structure diagram of a terminal lending system according to a third embodiment.

As shown in FIG. 11, the terminal lending system according to the third embodiment, is constituted of a management device 10, a plurality of output devices 30A, a plurality of lending terminals 40, a network 50, a user terminal 60, and a plurality of providing/collecting terminals 70.

The management device 10 manages the reservation situation and lending situation of the lending terminals 40, applying information that is stored in the database 10A.

The database 10A stores a management table, a user information table, a reserving person table, and a time table.

As shown in FIG. 12A, the management table stores information indicating possible lending time and date of the lending terminals 40 and placing location (placing station) of the lending terminals 40, in addition to the information (terminal information, lending situation, reservation situation, and a user information) indicated in the second embodiment.

The user information table is substantially the same as the user information table indicated in the first embodiment.

The reserving person table is substantially the same as the reserving person table indicated in the second embodiment.

As shown in FIG. 12B, a time table shows arrival and departure time of each train at each station.

Each providing/collecting terminal 70 is placed at a terminal providing/collecting place 7, and has the functions of both the providing terminal 20 and the collecting terminal 30, shown in the second embodiment.

Figures 13A, 13B:
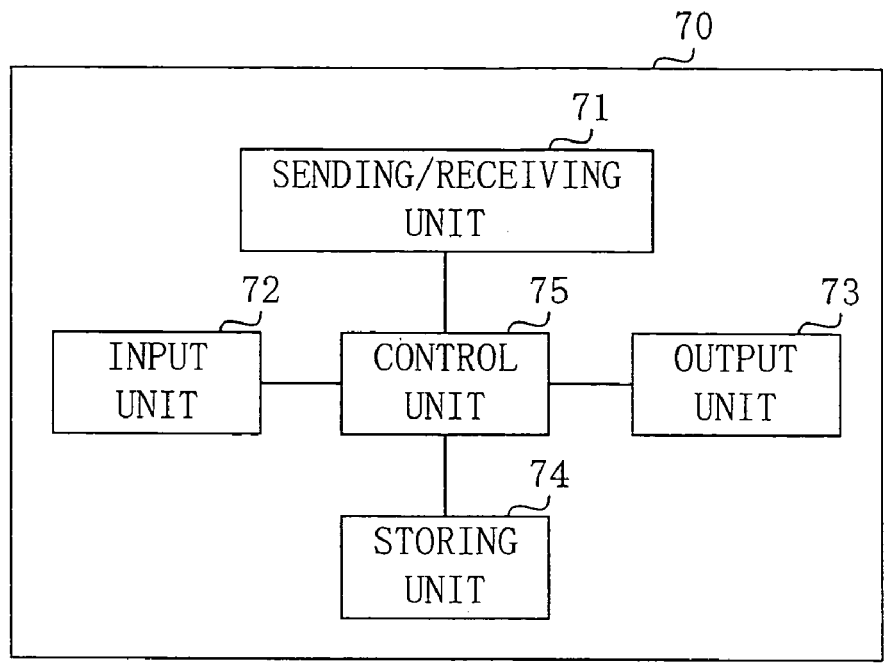
FIG. 13A is structure diagram of a providing/collecting terminal that constitutes the terminal lending system in FIG. 11.
FIG. 13B is a diagram showing an inventory table stored by a storing unit that structures the providing/collecting device.

As shown in FIG. 13A, each the proving/collecting terminals 70 is constituted of a sending/receiving unit 71, an input unit 72, an output unit 73, a storing unit 74, and a control unit 75.

The sending/receiving unit 71 is connected to the network 50 by using cable or by radio, and intermediates sending and receiving of data (information) between the control unit 75 and the management device 10.

The input unit 72 comprises at least one input means, such as a keyboard, a mouse, a touch panel, or a bar code reader, and is operated by an operator of the providing/collecting terminal 70. The input unit 72 inputs the terminal ID of the lending terminal 40 that is to be lent or to be returned and information concerning the user who borrows or returns the lending terminal 40, according to the operation of the operator.

The output unit 73 comprises a display, etc., and displays terminal information of the lending terminals 40 that are placed at the terminal providing/collecting place 7.

The storing unit 74 is constituted of a hard disk, a RAM, and a ROM, and stores data and programs for operating the providing/collecting terminal 70. For example, the storing unit 74 stores an inventory table shown in FIG. 13B.

As shown in FIG. 13B, the inventory table stores corresponding to each other, terminal information and reservation situation of the lending terminals 40 that are placed at the terminal providing/collecting place 7.

The control unit 75 is constituted of a CPU, and carries out lending and collecting of the lending terminals 70, according to the programs that the storing unit 74 stores. Detailed description of operations carried out by the control unit 75 will be later described.

The structure of the terminal lending system, other than the above, is substantially the same as the second embodiment.

Next, operations of the terminal lending system according to the third embodiment will be described.

In the same way as the second embodiment, the user terminal 60 access to the management device 10, and sends a reservation signal for requesting reservation of a lending terminal 40 to the management device 10, according to the operation of the user.

Figure 14:
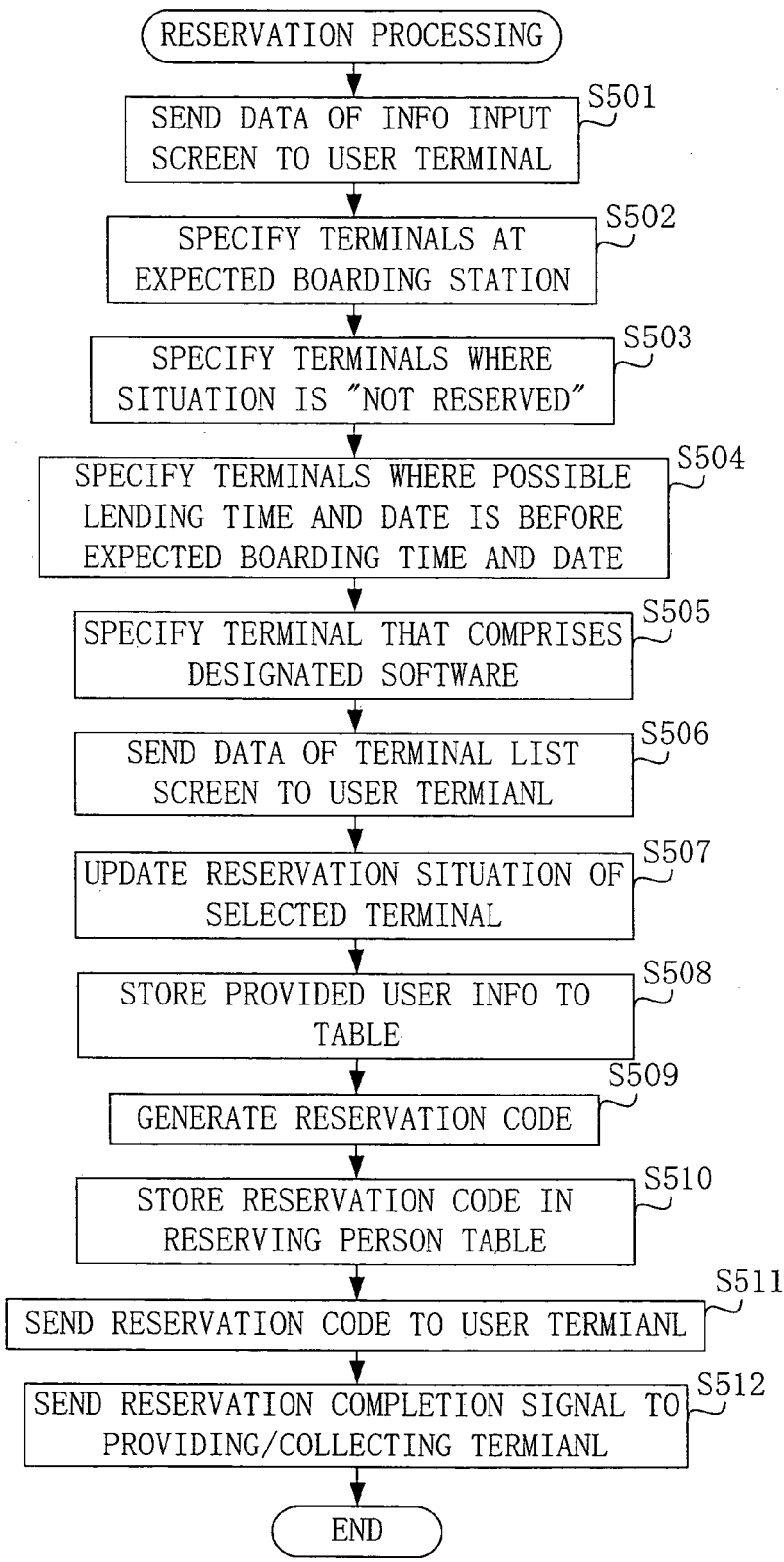
FIG. 14 is a flowchart showing a reservation processing carried out by the control unit of the management device.

The control unit 13 of the management device 10 starts reservation processing shown in FIG. 14, according to the program that the storing unit 12 stores, in response to the reservation signal provided by the user terminal.

In the same way as the second embodiment, the control unit 13 sends data of an information inputting screen for inputting necessary information, to the user terminal 60 via the network 50 (Step S501).

The user terminal 60 displays the information inputting screen that shows the provided data, in response to the data that is provided by the management device 10.

The users operate the user terminal 60, to input necessary information to the displayed information inputting screen. Necessary information is user information, kind of application software that is to be applied, expected station to ride on a train (expected boarding station) and expected time and date of boarding.

The user terminal 60 sends to the management device 10, via the network 50, the information that the user input to the information inputting screen (user information, type of software, expected boarding station, and expected time and date of boarding), in accordance with the operation of the user.

The control unit 13 of the management device 10 searches the management table of the database 10A, and specifies the lending terminals 40 that are placed at the provided expected boarding station, in response to the information provided by the user terminal 60(Step S502).

Sequentially, the control unit 13 specifies lending terminals 40, in which the reservation situation is "not reserved" from the specified lending terminals 40 (Step S503).

Furthermore, the control unit 13 specifies lending terminals 40, in which the possible lending time and date is before the provided expected time and date of boarding, from the specified lending terminals 40 (Step S504).

Thereafter, the control unit 13 specifies lending terminals 40 that have the kind of application software that the user designated, from the specified lending terminals 40 (Step S505).

Processing after step S506 are substantially the same as the processing after Step S304 of the reservation processing indicated in the second embodiment of the present invention.

On the other hand, in the same way as the second embodiment, the user terminal 60 presents a reservation code to the user, by displaying the reservation code provided by the management device 10. In the same way as the second embodiment, the control unit 75 of the providing/collecting terminal 70 updates the reservation situation of the reserved lending terminal 40, stored in the inventory table of the storing unit 74.

Thus, reservation of the lending terminal 40 is completed.

After the user reserves the lending terminal 40, the user goes to the terminal providing/collecting place 7, and carries out the predetermined procedure.

In the lending procedure, the user presents for example, identification to the operator of the providing/collecting terminal 70. Additionally, the user presents the reservation code provided by the management device 10, information of the train to be boarded (name of train, boarding station, and departure time, etc.), and exit station, etc., to the operator.

The operator of the terminal providing/collecting place 7 confirms the identity of the user by the provided identification. Then, the operator operates the input unit 72 of the providing/collecting terminal 70, to input the provided reservation code, information of train, and information of exit station, etc.

The input unit 72 inputs the reservation code, information of train, and information of exit station to the control unit 75, in response to the operation of the operator.

Figure 15:
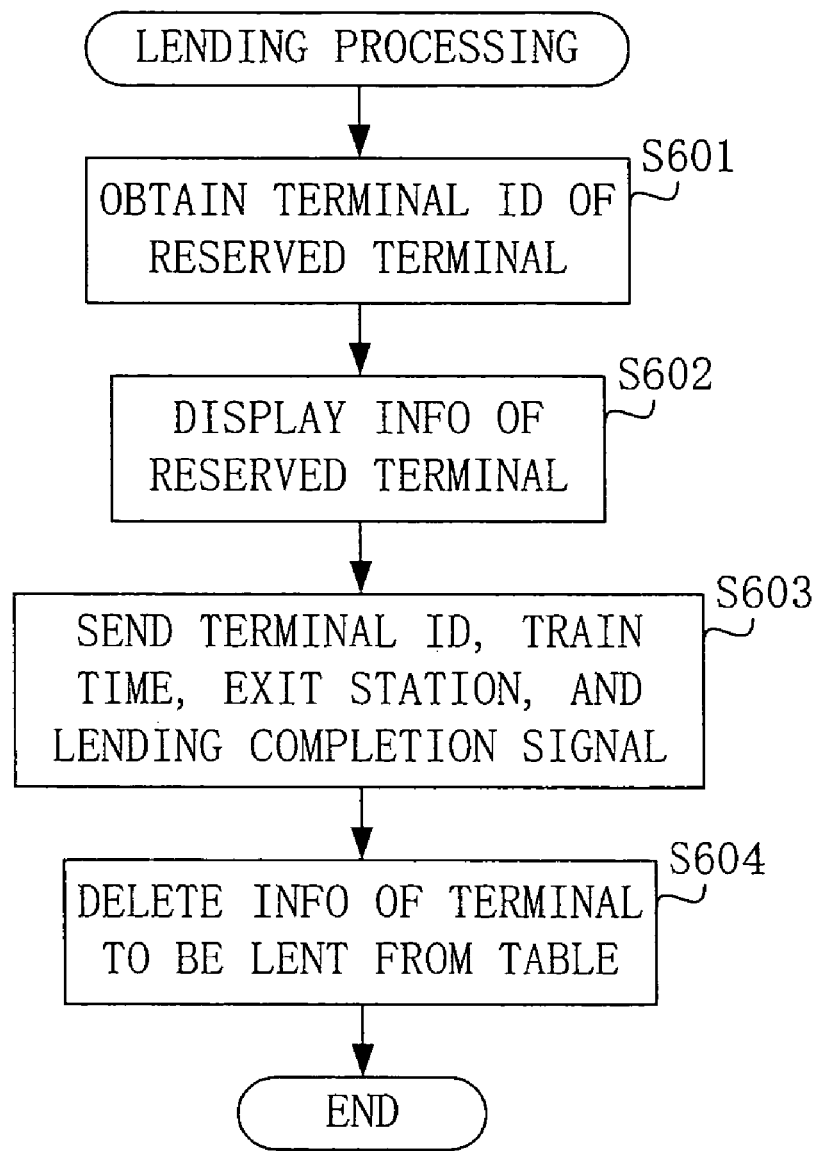
FIG. 15 is a flowchart showing a lending processing carried out by a control unit of the providing/collecting terminal.

The control unit 75 starts the lending processing shown in FIG. 15, in response to the reservation code, information of train, and information of exit station, provided by the input unit 72.

Processing of Steps S601 to S602 are substantially the same processing as the processing of Steps S401 to S402, as indicated in the second embodiment of the present invention.

After displaying the terminal information, the control unit 75 sends the terminal ID of the lending terminal 40 that is to be lent, information of train, and information of exit station, with a lending completion signal that indicates that the lending processing is completed, to the management device 10 (Step S603).

The control unit 75 deletes the information of the lending terminal 40 that is to be lent to the user from the inventory table in the storing unit 74 (Step S604), and completes the lending processing.

The control unit 13 of the management device 10, in response to the lending completion signal from the providing/collecting terminal 70, updates the management table, user information table, and the reserving person information table in the database 10A, in the same way as the second embodiment.

In the third embodiment, the control unit 13 further updates the placing location (placing station) of the lent lending terminal 40, and obtains the next possible time and date (possible lending time and date) that the lending terminal 40 can be lent.

Concretely, the control unit 13 stores the exit station that the information provided by the providing/collecting terminal 70 indicates, as the placing location of the lent lending terminal 40, to the management table in the database 10A.

The control unit 13 obtains the time of arrival to exit station of the train that the user is on, applying the time table in the database 10A and the provided information of train and information of exit station.

Sequentially, the control unit 13 obtains the possible lending time and date, according to a predetermined rule. For example, the control unit 13 obtains the possible lending time and date as thirty minutes after the obtained arriving time.

The control unit 13 stores the obtained possible lending time and date to the management table, corresponding it with the terminal ID that is provided from the providing/collecting terminal 70.

On the other hand, the user who borrowed the lending terminal 40, uses the lending terminal 40 in the train, and returns the lending terminal 40 to a terminal providing/collecting place 7, at the exit station, or near the exit station.

The operation that the providing/collecting terminal 70 carries out at the time of the returning of the lending terminal 40 is substantially the same as the operation that the collecting terminal 30, shown in the first embodiment, carries out. The operation that the management device 10 carries out at the time of returning the lending terminal 40 is substantially the same as the first embodiment.

As the above, by providing terminal providing/collecting places 7 at stations or near stations, a system that can easily be used by users who use the trains, can be realized. Because the possible lending time and date of the lending terminal 40 can be obtained based on the time table of trains, the reservation by users, can be received effectively, even in a case where the number of lending terminals 40 is small.

The utility fee of the lending terminal 40 may be collected from the user at the time the lending terminal 40 is lent. In this case, payment may be carried out applying cash, a prepaid card, a credit card, or an IC (Integrated Circuit) card that stores electronic money information.

The control unit 13 of the management device 10 may obtain a utility fee, in accordance with the storage capacity of the lending terminal 40.

The utility fee of the lending terminal 40 may be determined in accordance with the amount of data that is output from the output device 30A. In this case, the control unit 35 of the collecting terminal 30 and the control unit 75 of the providing/collecting terminal 70 may send information that indicates the amount of output data, to the management device 10. The management device 10 may obtain a utility fee by applying information provided by the collecting terminal 30 and the providing/collecting terminal 70.

The control unit 35 of the collecting terminal 30 and the control unit 75 of the providing/collecting terminal 70 may directly obtain unique information (terminal ID, etc.) of the lending terminal 40 from the connected lending terminal 40. In this case, it is not necessary for the operator to operate the collecting terminal 30 or the providing/collecting terminal 70 to input the terminal ID of the returned lending terminal 40.

In the third embodiment, the database 10A does not have to store a time table. The time table may be stored in the server of for example a railroad company. In this case, the control unit 13 of the management device 10 may access to the server of the railroad company via the network 50, and obtain information stored in the time table.

In the third embodiment, a train is shown as an example of a vehicle, but the vehicle may be airplanes, buses, or ships. In other words, the terminal providing/collecting places 7 may be placed not only at train stations, but also at airports, bus stops, and harbors, etc.

Figure 16:
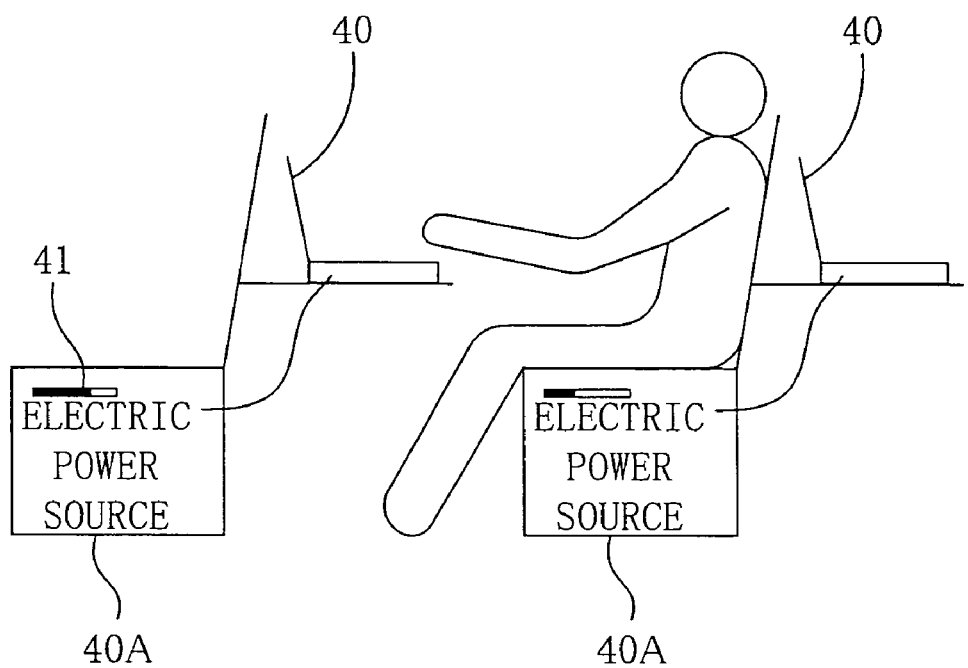
FIG. 16 is a diagram showing an example where an electric supply unit is placed at a seat of a vehicle.

As shown in FIG. 16, an electric power unit 40A that provides electric power to the lending terminal 40 may be provided at the seat of a vehicle, and it may be that electric supply to the lending terminal 40 is only possible from the electric power unit 40A. In this case, the electric power unit 40A may comprise an indicator 41 that displays the remaining amount of electric power that is possible to be provided.

The lending terminals 40 may be provided at the seats of vehicles. In this case, reservation of the lending terminal 40 and the reservation of a seat can be carried out simultaneously. Additionally, the management of the lending terminals 40 can be easily carried out.

The electric power unit 40A may comprise cash slots and/or card slots, and provide electric power to the lending terminal 40, corresponding to the paid amount by cash, electronic money, prepaid card, or credit card, etc.

The lending terminals 40 may output data to the collecting terminal 30, the providing/collecting terminal 70, or the output device 30A, by applying IrDA (Infrared Data Association) or Bluetooth, etc.

The lending terminals 40 may comprise detachable memories. The data collected and created by the users, applying the lending terminals 40 may be stored in the detachable memories. In this case, the body of the lending terminal 40 is lent to the user, and the detachable memory may be sold to the user.

Providing of terminals to users may be carried out by not only lending but by also selling. In a case where terminals are to be sold, it is not necessary for the management device 10 to manage the collecting situation of terminals.

The device of the present invention can be realized by a general computer, without the need for a dedicated device. For example, a program and data for controlling a computer to execute the above-described processes may be recorded on a recording medium (a FD, a CD-ROM, a DVD, and a semiconductor memory, etc.), and distributed, and the program may be installed into the computer and run on an OS to execute the above-described processes, thereby achieving the device of the present invention. The above program and data may be stored in a disk device or the like included in the server device on the Internet, and embedded in a carrier wave, and may be downloaded, etc. to a computer.

The present invention is based on the Japanese Patent Application No.2001-176034 filed on Jun. 11, 2001, and including specification, claims, drawings and summary. The disclosure of the above Japanese Patent Application is incorporated herein by reference in its entirety.

The invention claimed is:

1. A terminal providing system comprising:
a plurality of terminals placed at a providing place for providing terminals to users, and comprising one or more application software;
a providing device placed at the providing place, and that carries out processing for providing to a user, a terminal which comprises the application software that the user designates, from the plurality of terminals; and
a collecting device placed at a collecting place for collecting the terminals provided to the users, and that carries out processing for collecting terminals which are returned by the users; wherein
the providing device comprises a memory which stores information concerning the plurality of terminals which are placed at the providing place, a specifying unit which specifies a terminal which comprises the application software that the user designated, applying the information that said memory stores, a calculating unit which calculates a possible time and date when said terminal specified by said specifying is provided to the user, a presenting unit which presents to the user, the terminal specified by the specifying unit at the possible time and date calculated by the calculating unit, and a time and date obtaining unit which obtains a next possible time and date when the terminal provided to the user becomes possible to be provided to another user, by applying a time table that shows arrival and departure time of each station of the vehicles.

2. A terminal providing system according to claim 1, wherein said collecting device comprises:
a determining unit which determines whether the user who received providing of the terminal and the user who returns the terminal is the same;

a collecting unit that carries out processing for collecting the terminal in a case where it is determined that the user is the same, and stops the processing for collecting the terminal in a case where it is determined that the user is not the same.

3. The terminal providing system according to claim 1, wherein said collecting device comprises a deleting unit which deletes data that is stored in the returned terminal.

4. The terminal providing system according to claim 1, further comprising an output device that is provided at the collecting place, wherein said output device acquires data stored in the terminal and outputs said data in a case where said determining unit determines that the user who received the terminal and the user who returned the terminal are the same.

5. The terminal providing system according to claim 4, wherein said output device comprises at least one of a printer that prints data to paper, a recorder that records data to a recording medium, and a sending device that sends data to external terminals by a communication network.

6. The terminal providing system according to claim 5, further comprising a charging device which charges the user according to an amount of data output by the output device.

7. The terminal providing system according to claim 1, further comprising a management device which manages the providing of the plurality of terminals, wherein the management device comprises a reservation reception unit which receives reservation of terminals.

8. The terminal providing system according to claim 7, wherein said management device comprises a charging unit which obtains a utility fee of the terminal, based on at least one of the model of the terminal, a kind of application software the terminal has, and a utility time of the terminal.

9. A terminal providing system comprising:
a plurality of terminals placed to each of a plurality of providing/collecting places, which are provided to a plurality of stations of vehicles, for providing terminals to users and collecting the terminals that are returned by the users, and that include one or more application software; and
a plurality of providing/collecting devices placed at the plurality of providing/collecting places;
wherein each of the plurality of providing/collecting devices comprises a providing unit which carries out processing for providing to a user, a terminal that has the application software that the user designates, a calculating unit which calculates a possible time and date when said terminal is provided to the user and a next possible time and date when the terminal provided to the user becomes possible to be provided to another user, by applying a time table that shows arrival and departure time of each station of the vehicles, and a collecting unit which carries out processing for collecting the terminal that is returned from the user.

10. The terminal providing system according to claim 9, wherein said providing/collecting device comprises a determining unit which determines whether the user who is provided the terminal is the same as the user who is returning the terminal, and the collecting unit may carry out processing for collecting the terminal in a case where the determining unit determines that the user is the same, and may stop the processing for collecting the terminal in a case where the determining unit determines that the user is not the same.

11. The terminal providing system according to claim 9, wherein said providing/collecting device comprises a deleting unit which deletes data stored in the returned terminal.

12. The terminal providing system according to claim 10, further comprising a plurality of output devices placed at the plurality of providing/collecting places, wherein said output device acquires data stored in the terminal and outputs said data in a case where said determining unit determines that the user who received the terminal and the user who returned the terminal are the same.

13. The terminal providing system according to claim 12, wherein each of the output devices comprises at least one of a printer that prints data to paper, a recorder that records data to a recording medium, and a sending device that sends data to external terminals by a communication network.

14. The terminal providing system according to claim 12, further comprising a charging device which charges the user of a utility fee in accordance with an amount of data output by the plurality of output devices.

15. The terminal providing system according to claim 9, further comprising a management device which manages the providing of the plurality of terminals, wherein the management device comprises a reservation reception unit which receives reservation of terminals.

16. The terminal providing system according to claim 15, wherein said management device comprises a first specifying unit which specifies a terminal that has the application software that the user designates, from the terminals which are placed at the station where the user is to ride a vehicle, wherein the reservation reception unit receives reservation of the terminal specified by said first specifying unit.

17. The terminal providing system according to claim 16, wherein said management device comprises a second specifying unit which specifies terminals in which the possible time and date is before the time and date that the user rides the vehicle, from the terminals placed at the station where the user is to ride the vehicle, wherein the first specifying unit specifies the terminal that comprises the application software that the user designated, from the terminals specified by the second specifying unit.

18. The terminal providing system according to claim 15, wherein said management device comprises a charging unit which obtains a utility fee of the terminal, based on at least one of a model of terminal, a kind of application software the terminal has, and a utility time of the terminal.

19. The terminal providing system according to claim 14, further comprising an electric power unit provided at a seat of the vehicle, and that provides electric power to the terminal, wherein said terminal is possible to be provided electric power only from said electric power unit.

20. The terminal providing system according to claim 19, wherein said electric power unit comprises an indicator which indicates a remaining amount of electric power that is possible to be provided.

21. The terminal providing system according to claim 19, wherein said electric power unit provides electric power to said terminal, in accordance with an amount of money paid by the user.

22. A terminal providing device provided at a providing place for providing terminals to users, and which carries out processing for providing terminals to users and comprises:
a memory which stores information concerning a plurality of terminals which comprise one or more application software;
a specifying unit which specifies one of said terminals which comprises an application software that is designated by a user, by applying information that said memory stores;

a calculating unit which calculates a possible time and date when said terminal specified by said specifying is provided to the user;

a presenting unit which presents to the user the terminal specified by the specifying unit at the possible time and date calculated by the calculating unit; and a time and date obtaining unit which obtains a next possible time and date when the terminal provided to the user becomes possible to be provided to another user, by applying a time table that shows arrival and departure time of each station of the vehicles.

23. A terminal management device placed in each of a plurality of providing/collecting places provided at a plurality of stations of vehicles, to provide terminals to users and collect terminals returned by the users, which manages the providing of the plurality of terminals which comprise one or more application software, and comprises:

a first memory which stores information concerning the plurality of terminals;

a second memory which stores information concerning the providing/collecting places;

a first specifying unit which specifies one of the terminals that comprise an application software that a user designated from the terminals that are placed at stations where the user rides the vehicle, based on the information stored in the first memory;

a calculation unit which calculates a possible time and date when said terminal specified by said first specifying unit is provided to the user, based on the information stored in said second memory;

a reservation receiving unit which receives reservation for the user to be provided with the terminal that is specified by said first specifying unit at the possible time and date calculated by said calculation unit; and a time and date obtaining unit which obtains a possible time and date when the terminal provided to the user becomes possible to be provided to another user, by applying a time table that shows arrival and departure time of each station of the vehicles.

24. The terminal management device according to claim 23, further comprising a second specifying unit which specifies terminals in which said possible time and date is before the time and date that the user rides the vehicle, from the terminals placed at the station where the user is to ride the vehicle, wherein said first specifying unit specifies the terminal that comprises the application software that the user designated, from the terminals specified by the second specifying unit.

25. A terminal providing method comprising:

a providing step which carries out processing for providing a terminal to a user; and a collecting step which carries out processing for collecting the terminal that is returned by the user, wherein said providing step comprises, a first specifying step of specifying a terminal which includes an application software designated by a user, from the plurality of terminals which can be provided to users, and comprise one or more application software, a calculating step of calculating a possible time and date when said terminal specified by said specifying step is provide to the user, and a presenting step of presenting to the user said terminal specified by said first specifying step at the possible time and date calculated by said calculating step, and a time and date obtaining step of obtaining a next possible time and date when the terminal provided to the user becomes possible to be provided to another user, by applying a time table that shows arrival and departure time of each station of the vehicles.

26. The terminal providing method according to claim 25, wherein the first specifying step comprises a second specifying step of specifying terminals in which said possible time and date is before the time and date that the user rides the vehicle, from the terminals placed at the station where the user is to ride the vehicle, wherein said first specifying step comprises a third specifying step of specifying the terminal that comprises the application software that the user designated, from the terminals specified by the second specifying step.

27. A computer readable recording medium that stores a program to function as a terminal providing device provided at a providing place for providing terminals to users, and which carries out processing for providing terminals to users, and comprises:

a memory which stores information concerning a plurality of terminals which comprise one or more application software;

a specifying unit which specifies the terminal which comprises an application software that is designated by a user, by applying information that said memory stores;

a calculating unit which calculates a possible time and date when said terminal specified by said specifying is provided to the user;

a presenting unit which presents to the user the terminal specified by said specifying unit at the possible time and date calculated by the calculating unit; and a time and date obtaining unit which obtains a next possible time and date when the terminal provided to the user becomes possible to be provided to another user, by applying a time table that shows arrival and departure time of each station of the vehicles.

28. A computer readable recording medium that stores a program for controlling a computer to function as a terminal management device which manages a providing situation of a plurality of terminals including one or more application software, which are placed at each of a plurality of providing/collecting places, which are provided to a plurality of stations of vehicles, for providing terminals to users and collecting the terminals that are returned by the users, said terminal management device comprising:

a first memory which stores information concerning the plurality of terminals;

a second memory which stores information concerning the providing/collecting places;

a specifying unit which specifies a terminal that has an application software that a user designates, from the terminals that are placed at a station where the user is to ride a vehicle, based on the information stored in the first memory;

a calculation unit which calculates a possible time and date when said terminal specified by said specifying unit is provided to the user, based on the information stored in said second memory;

a reservation reception unit which receives reservation for the user to be provided with the terminal that is specified by said specifying unit at the possible time and date calculated by said calculation unit; and a time and date obtaining unit which obtains a next possible time and date when the terminal provided to the user becomes possible to be provided to another user, by applying a time table that shows arrival and departure time of each station of the vehicles.

* * * * *